US010170904B2

(12) United States Patent
Peach et al.

(10) Patent No.: US 10,170,904 B2
(45) Date of Patent: Jan. 1, 2019

(54) SURGE REDUCTION FILTER

(71) Applicant: PIVOT ELECTRONICS PTY LTD, Warriewood, New South Wales (AU)

(72) Inventors: Philip Louis Peach, Church Point (AU); Michael Henry Drewry, Glenorie (AU); Bruce Raymond Russek, Mount Hallen (AU)

(73) Assignee: PIVOT ELECTRONICS PTY LTD, Warriewood, New South Wales (AU)

( * ) Notice: Subject to any disclaimer, the term of this patent is extended or adjusted under 35 U.S.C. 154(b) by 532 days.

(21) Appl. No.: 14/781,156

(22) PCT Filed: Apr. 2, 2014

(86) PCT No.: PCT/AU2014/000348
§ 371 (c)(1),
(2) Date: Sep. 29, 2015

(87) PCT Pub. No.: WO2014/161033
PCT Pub. Date: Oct. 9, 2014

(65) Prior Publication Data
US 2016/0064922 A1   Mar. 3, 2016

(30) Foreign Application Priority Data

Apr. 2, 2013   (AU) ................................ 2013901123

(51) Int. Cl.
*H02H 3/22*   (2006.01)
*H02H 9/04*   (2006.01)
(Continued)

(52) U.S. Cl.
CPC ............ *H02H 3/22* (2013.01); *G08B 21/185* (2013.01); *H02H 3/046* (2013.01); *H02H 3/048* (2013.01);
(Continued)

(58) Field of Classification Search
USPC .................................................. 361/111, 127
See application file for complete search history.

(56) References Cited

U.S. PATENT DOCUMENTS 4,271,446 A * 6/1981 Comstock .............. H02H 9/042
340/638
4,642,733 A   2/1987 Schacht
(Continued)

FOREIGN PATENT DOCUMENTS

EP   1 267 468 A2   12/2002
JP   H04-59617   5/1992
(Continued)

OTHER PUBLICATIONS

International Search Report for International Application No. PCT/AU2014/000348, dated Jul. 2, 2014, 5pp.
(Continued)

*Primary Examiner* — Ronald W Leja
(74) *Attorney, Agent, or Firm* — Lewis Roca Rothgerber Christie LLP

(57) ABSTRACT

A surge reduction filter (SRF) includes a cartridge having a cartridge housing, a first active connection point for connection to an active line of an AC power supply, and a neutral connection point for connection to a neutral line of the AC power supply. The active and neutral connection points are located to be accessible from outside the cartridge. A first fuse and a first surge protection element are electrically connected in series between the active and neutral connection points. A status circuit is connected to monitor the surge protection element and an indicator is connected to the status circuit to indicate at least a normal status and a fault status of the surge protection element. The status circuit detects a change in voltage at a point between the fuse and
(Continued)

the protection element and creates a fault indication if a voltage change is detected due to the fuse operating.

30 Claims, 13 Drawing Sheets

(51) Int. Cl.
  *G08B 21/18* (2006.01)
  *H02H 3/04* (2006.01)
  *H02H 3/05* (2006.01)
  *H02H 9/00* (2006.01)
(52) U.S. Cl.
  CPC .............. *H02H 3/05* (2013.01); *H02H 9/005* (2013.01); *H02H 9/04* (2013.01); *H02H 9/042* (2013.01)

(56) References Cited

U.S. PATENT DOCUMENTS

| | | | |
|---|---|---|---|
| 4,675,772 A | 6/1987 | Epstein | |
| 5,010,438 A * | 4/1991 | Brady | H02H 9/042 340/638 |
| 5,206,779 A | 4/1993 | Sato et al. | |
| 5,412,526 A * | 5/1995 | Kapp | H02H 3/046 360/111 |
| 5,508,876 A | 4/1996 | De la Croix Vaubois et al. | |
| 5,739,737 A | 4/1998 | Hatton | |
| 5,914,845 A * | 6/1999 | Chase | H02H 9/042 361/111 |
| 6,122,157 A | 9/2000 | Gerlach | |
| 6,366,469 B1 * | 4/2002 | Odenberg | H05K 1/145 361/111 |
| 6,501,634 B1 * | 12/2002 | Hubbell | H01H 85/44 361/103 |
| 6,678,140 B2 * | 1/2004 | Jakwani | H01T 4/06 211/189 |
| 6,778,375 B1 * | 8/2004 | Hoopes | H02H 9/042 361/120 |
| 7,050,285 B2 | 5/2006 | Sato et al. | |
| 8,035,947 B2 * | 10/2011 | Hoopes | H02H 9/042 361/103 |
| 2004/0246644 A1 | 12/2004 | Sato et al. | |
| 2005/0168920 A1 | 8/2005 | Arai et al. | |
| 2006/0002049 A1 | 1/2006 | Yegin et al. | |
| 2008/0304200 A1 | 12/2008 | Hotchkiss et al. | |
| 2009/0073618 A1 | 3/2009 | Wang | |
| 2009/0296303 A1 | 12/2009 | Petersen | |
| 2010/0014205 A1 * | 1/2010 | Gerlach | H02H 9/042 361/111 |
| 2012/0050935 A1 | 3/2012 | Douglass et al. | |
| 2012/0147512 A1 | 6/2012 | Fujisawa et al. | |
| 2012/0206848 A1 | 8/2012 | Gillespie et al. | |
| 2012/0295456 A1 | 11/2012 | Severac | |

FOREIGN PATENT DOCUMENTS

| | | |
|---|---|---|
| JP | H06-35634 | 9/1994 |
| JP | H07-027251 | 5/1995 |
| JP | H10-257616 A | 9/1998 |
| JP | H10-326702 A | 12/1998 |
| JP | 2004-187427 | 7/2004 |
| JP | 2008-295254 A | 12/2008 |
| JP | 2011-083098 A | 4/2011 |
| JP | 2012-222960 A | 11/2012 |

OTHER PUBLICATIONS

Extended European Search Report dated Dec. 21, 2016 for corresponding European Patent Application No. 14779981.1, 8pp.
Japanese Office Action dated Mar. 19, 2018 regarding Japanese Patent Application No. 2016-505652 corresponding to U.S. Appl. No. 14/781,156 (4 pages) with English Translation (5 pages).
Japanese Office Action dated Sep. 10, 2018 regarding Japanese Patent Application No. 2016-505652 corresponding to U.S. Appl. No. 14/781,156 (7 pages) with English Translation (7 pages).

* cited by examiner

SURGE REDUCTION FILTER

CROSS-REFERENCE TO RELATED APPLICATIONS

This application is a national phase application under 35 U.S.C. § 371 of International Application No. PCT/AU2014/000348, filed on Apr. 2, 2014, which claims the benefit of Australian Provisional Application No. 2013901123, filed on Apr. 2, 2013, the disclosures of which are incorporated herein by reference in their entirety.

The present invention relates to transient protection systems for power supplies and in particular the invention provides a new configuration of a protection device for protection against supply voltage surge and/or noise.

BACKGROUND

Electronic equipment is generally highly reliable when operated within environmental and electrical design specifications but is vulnerable to failure when such specifications are exceeded. Electronic equipment is particularly vulnerable to exposure to excessively high voltages, even if exposure is extremely brief, such as when a transient spike is injected into a power supply line. Such transients may only last for microseconds but may expose the connected circuitry to extremely high voltages several orders of magnitude greater than the nominal supply voltage. Where the load on a supply line is very large and distributed, such as is the case with distributed supplies in a residential or industrial area, supply authorities protect supplies with air-gap surge protectors which remove the worst of transients from the supply network, such that any remaining transients may be absorbed by the distributed load without significant damage. However consumers are often urged to protect sensitive equipment such as computers and expensive audio/visual equipment from residual surges with commercial power supply filters.

On the other hand, where equipment is connected to a dedicated supply line and particularly where the equipment is at well-spaced locations on a linear supply line such as in a railway signalling system, the equipment may be exposed to significant transients due to lightning strike. In the case of railway systems a further problem may exist where passing trains also inject significant noise levels into supply lines.

Railways routinely use Surge Reduction Filters (SRFs) to locally protect the Signalling power system(s) from potentially damaging power fluctuations as a result of supply-side lightning strikes, power surges or other undefined transient currents. Other important infrastructure having sensitive equipment installations such as telephone exchanges and mobile phone transmitter towers, hospitals, computer server farms, airport control towers and military installations may also use SRFs to minimise outages due to supply fluctuations.

In the past, SRFs have incorporated protection elements (typically metal-oxide varistors (MOVs)) which are semi-permanently mounted using bolted connections, thus requiring disassembly of the circuit, or swapping out of the entire SRF, when the protection element becomes unserviceable. In the case of railway signalling systems, the frequency of replacement for the protection element in some areas may be as often as every 6 months. Maintenance is therefore time consuming and requires the supply to be powered down while maintenance is performed, which for a railway system means halting of trains. A rail network may have hundreds of SRFs distributed over a vast area.

Another issue for railway systems is that of vibration. Trackside installations exist in a high vibration environment with operators often requiring that equipment be rated to withstand vibration forces of at least 11G.

High resistance connections can form due to loosening of terminal connections due to vibration. Where bolted connections include multiple connections on a single stud, loosening of one connection may also occur when another connection is tightened, inadvertently causing a high resistance contact in the loosened connection, leading to a fault.

SRFs associated with remotely located equipment may also fail without the knowledge of operators, until such time as the equipment being protected malfunctions causing a serious safety hazard.

SUMMARY

According to a first aspect, a surge reduction filter (SRF) comprises a cartridge including a cartridge housing, a first active connection point for connection to an active line of an AC power supply, and a neutral connection point for connection to a neutral line of the AC power supply, the active and neutral connection points being located to be accessible from outside the cartridge, a first fuse and a first surge protection element electrically connected in series between the active and neutral connection points, a status circuit connected to monitor the surge protection element and an indicator connected to the status circuit to indicate at least a normal status and a fault status of the surge protection element, the status circuit detecting a change in voltage at a point between the fuse and the protection element and creating a fault indication if a voltage change is detected due to the fuse operating.

In an embodiment of the SRF, the first fuse may be connected to the first active connection point and the first surge protection element may be connected between the other side of the first fuse and the neutral connection point. The cartridge may also include an earth connection point, a second fuse and a second surge protection element, where the earth connection point is located to be accessible from outside the cartridge, and the second fuse and the second surge protection element may be connected in series between the first active connection point and the earth connection point. The second fuse may also be connected to the first active connection point and the second surge protection element may be connected between the other side of the second fuse and the earth connection point. The cartridge may also include third and fourth surge protection elements the former connected between said other side of the first fuse and the neutral connection point, the latter connected between said other side of the second fuse and the earth connection point.

In an embodiment for a three phase power supply, the cartridge may include a second active connection point for connection to a different phase of the AC power supply with respect to the phase of the first active connection point with the second active connection point also being located to be accessible from outside the cartridge. In this case the second fuse and the second surge protection element, may be connected in series between the first active connection point and the second active connection point with one side of the second fuse connected to the first active connection point and the second surge protection element connected between the other side of the second fuse and the second active connection point. Similarly, a third surge protection element may be connected between said other side of the first fuse and the second active connection point and a fourth surge protection element may be connected between said other side of the second fuse and the neutral connection point.

The status circuit may monitor the state of each of the first and second fuses and produce a different fault indication when one fuse is operated compared to a fault indication produced when two fuses are operated.

The cartridge for both single phase and three phase systems may also include a fifth surge protection element connected between the neutral connection point and the earth connection point. Optionally the cartridge may also include a sixth surge protection element connected between the neutral connection point and the earth connection point but this second (i.e. redundant) neutral to earth protection element may be omitted from cartridges for 3 phase systems as there will still be 3 neutral to earth protection elements provided by 3 cartridges.

The SRF may include a cartridge tray into which the cartridge is insertable. The cartridge tray may have connectors projecting from its base, which co-operate with connectors projecting from the cartridge and which are associated with the contact points of the cartridge, whereby the connectors in the tray and the cartridge connect the circuit in the cartridge to an external circuit comprising the AC supply. The cartridge tray and the cartridge may be co-operatively keyed for correct orientation of insertion of the cartridge into the cartridge tray and the connector location in the cartridge tray and cartridge may be varied according to a cartridge voltage rating to co-operatively key the cartridge and cartridge tray to prevent connection of an incorrectly rated cartridge.

Each cartridge may include a status indicating LED, which indicates a status of the surge protection elements monitored by the status circuit, by changing a state of emission of the LED. The cartridge may also include a remote monitoring output connected via a monitoring connection point with co-operating connectors projecting from the base of the cartridge tray and the cartridge to connect the remote monitoring output to a remote monitoring interface.

According to a second aspect, a surge reduction filter comprises a first raw side active connector of one AC power phase, a first clean side active connector, a raw side neutral connector, a clean side neutral connector, a first single solid active conductor connecting the first raw side active connector to the first clean side active connector, the first single solid active conductor forming a winding of an inductor intermediate its ends, a single solid neutral conductor connecting the raw side neutral connector to the clean side neutral conductor, the single solid neutral conductor forming a winding of an inductor intermediate its ends, a first surge protection element connected between the first clean side active connector and the clean side neutral connector.

The SRF may include a capacitor connected between the first clean side active connector and the clean side neutral connector. A printed circuit board is provided having tabs inserted into and connecting with the respective first clean side active connector, the clean side neutral connector and an earth connector and the capacitor may be mounted on the printed circuit board between the first clean side active connector and the clean side neutral connector.

Embodiments of the SRF use 'screwless type connectors with direct pressure' (as defined in Annex D of IEC 60947_1:2004. "Low-voltage switchgear and control gear Part 1: general Rules" and referred to herein as "screwless type connectors") for the first clean side active connector, the clean side neutral connector and the earth connector allowing the tabs of the printed circuit board to plug into voltage tap inputs of the screwless type connectors.

The surge protection element may be mounted in a cartridge plugably connectable to the printed circuit board. The cartridge may include a cartridge housing, a first active connection point, and a neutral connection point, the first active connection point and the neutral connection point being located to be accessible from outside the cartridge and plugably connectable to the clean side of the active conductor and the clean side of the neutral conductor respectively via the printed circuit hoard. A first fuse and the first surge protection element may be electrically connected in series between the active and neutral connection points. A status circuit may be connected to monitor the surge protection element and an indicator connected to the status circuit may indicate at least a normal status and a fault status of the surge protection element when the status circuit detects a change in voltage at a point between the fuse and the protection element to create a fault indication if a voltage change is detected due to the fuse operating.

The first fuse may be connected to the first active connection point and the first surge protection element may be connected between the other side of the first fuse and the neutral connection point. The cartridge may also include an earth connection point, a second fuse and a second surge protection element, with the earth connection point being located to be accessible from outside the cartridge and plugably connectable to the earth connector via the printed circuit board. The second fuse and the second surge protection element may be connected in series between the first active connection point and the earth connection point. The second fuse may also be connected to the first active connection point and the second surge protection element may be connected between the other side of the second fuse and the earth connection point.

The cartridge may also include a third surge protection element connected between said other side of the first fuse and the earth connection point and a fourth surge protection element connected between said other side of the second fuse and the neutral connection point. Fifth and optionally sixth surge protection elements may be connected between the neutral connection point and the earth connection point.

In a three phase embodiment the surge reduction filter may further comprise a second raw side active connector, a second clean side active connector, a third raw side active connector, a third clean side active connector, a second single solid active conductor connecting the second raw side active connector to the second clean side active connector, a third single solid active conductor connecting the third raw side active connector to the third clean side active connector, the second and third single solid active conductors each forming a winding of an inductor intermediate their ends, with surge protection elements connected between the second clean side active connector and the clean side neutral connector and between the third clean side active connector and the clean side neutral connector.

Capacitors may be connected between each clean side active connector and the clean side neutral connector. A printed circuit hoard is provided having tabs inserted into and connecting with the respective first second and third clean side active connectors, the clean side neutral connector and an earth connector and the capacitors may be mounted on the printed circuit hoard between the first, second and third clean side active connectors and the clean side neutral connector. Embodiments of the SRF use 'screwless type connectors with direct pressure' for the first second and third clean side active connectors, the clean side neutral connector and the earth connector allowing the tabs of the printed circuit board to plug into voltage tap inputs of the screwless type connectors.

The surge protection elements may be mounted in three identical cartridges plugably connectable to the printed circuit board, each cartridge providing surge protection between one phase active and neutral and between said one phase active and another phase active, each of the three cartridges being connectable to one of three phases and between one pair of three phase pairs, with the printed circuit board connecting different phases and phase pairs to each cartridge, whereby in combination the three cartridges provide phase to neutral protection for each of the phases and phase to phase protection between each phase pair of a three phase AC power supply.

Each of the three cartridges may include a cartridge housing, a first active connection point, and a neutral connection point, the first active connection point and the neutral connection point being located to be accessible from outside the cartridge and plugably connectable to the clean side of the active conductor and the clean side of the neutral conductor respectively via the printed circuit board. A first fuse and the first surge protection element may be electrically connected in series between the active and neutral connection points. A status circuit may be connected to monitor the surge protection element and an indicator connected to the status circuit may indicate at least a normal status and a fault status of the surge protection element, by detecting a change in voltage at a point between the fuse and the protection element and creating a fault indication if a voltage change is detected due to the fuse operating.

The first fuse may be connected to the first active connection point and the first surge protection element may be connected between the other side of the first fuse and the neutral connection point. Each cartridge may also include a second active connection point for connection to a different phase of the three phase AC power supply with respect to the phase of the first active connection point, a second fuse and a second surge protection element. The second active connection point may be located to be accessible from outside the cartridge and plugably connectable to the clean side of the second active conductor via the printed circuit board, and the second fuse and the second surge protection element may be connected in series between the first active connection point and the second active connection point. One side of the second fuse may also be connected to the first active connection point and the second surge protection element may be connected between the other side of the second fuse and the second active connection point.

The cartridge may include a third surge protection element connected between said other side of the first fuse and the second active connection point and may also include a fourth surge protection element connected between said other side of the second fuse and the neutral connection point.

The status circuit monitors the state of each of the first and second fuses and produces a different fault indication when one fuse is operated compared to a fault indication produced when two fuses are operated.

The cartridge may also include an earth connection point, located to be accessible from outside the cartridge and plugably connectable to an earth connector via the printed circuit board. A fifth surge protection element may be connected between the neutral connection point and the earth connection point.

The SRF may include three cartridge trays into which the three cartridges are insertable, with connectors projecting from a base of each cartridge tray co-operating with connectors projecting from each cartridge to connect the circuits in the cartridges to an external circuit comprising the AC supply. The cartridge trays and the cartridges may be co-operatively keyed for correct orientation of insertion of the cartridges into the cartridge trays. The connector locations in the cartridge trays and cartridges may also be varied according to a cartridge voltage rating to co-operatively key the cartridges and cartridge trays to prevent connection of incorrectly rated cartridges.

The cartridge, or each cartridge, may include a status indicating LED, which indicates a status of the surge protection elements monitored by the status circuit, by changing a state of emission of the LED. The cartridge, or each cartridge, may also include a monitoring connection point and the monitoring circuit may include a remote monitoring output connected to the monitoring connection point, with co-operating connectors projecting from the base of the cartridge tray and the cartridge associated connecting the remote monitoring output to a remote monitoring interface via the printed circuit board.

For each of the permutations of devices disclosed above, a further variation may be provided in which at least one fuse is connected to a raw active supply. In the case of the fuse connected to the raw active supply, protection elements may be connected from the fuse to a raw neutral line and/or a RAW adjacent phase line and/or an earth line of the AC supply. Monitoring of the status of the fuses is also similarly provided, however in the case of the fuse connected to the raw active supply, opto-coupling may be provided between the point monitored and the monitoring circuit for isolation.

The fuse or fuses connected to the raw active supply may be in addition to, or instead of, one or more fuses connected to the clean active supply as discussed above. In the case of the fuse connected to the clean active supply, protection elements may be connected from the fuse to a clean neutral line and/or a clean adjacent phase line and/or an earth line of the AC supply.

Protective devices may also be connected between a clean and/or raw neutral and earth.

Each of the surge protection elements may be an MOV.

BRIEF DESCRIPTION OF THE DRAWINGS

FIGS. 1A & B provide an electrical schematic drawing of an example of a single phase SRF device in which;

FIG. 1A show a chassis circuit, and

FIGS. 7A & B provide an electrical schematic drawing of an alternative example of a single phase SRF device in which;

FIG. 7A shows a chassis and auxiliary circuit board circuits, and

DETAILED DESCRIPTION OF AN EMBODIMENT

Example 1

Figure 1A:
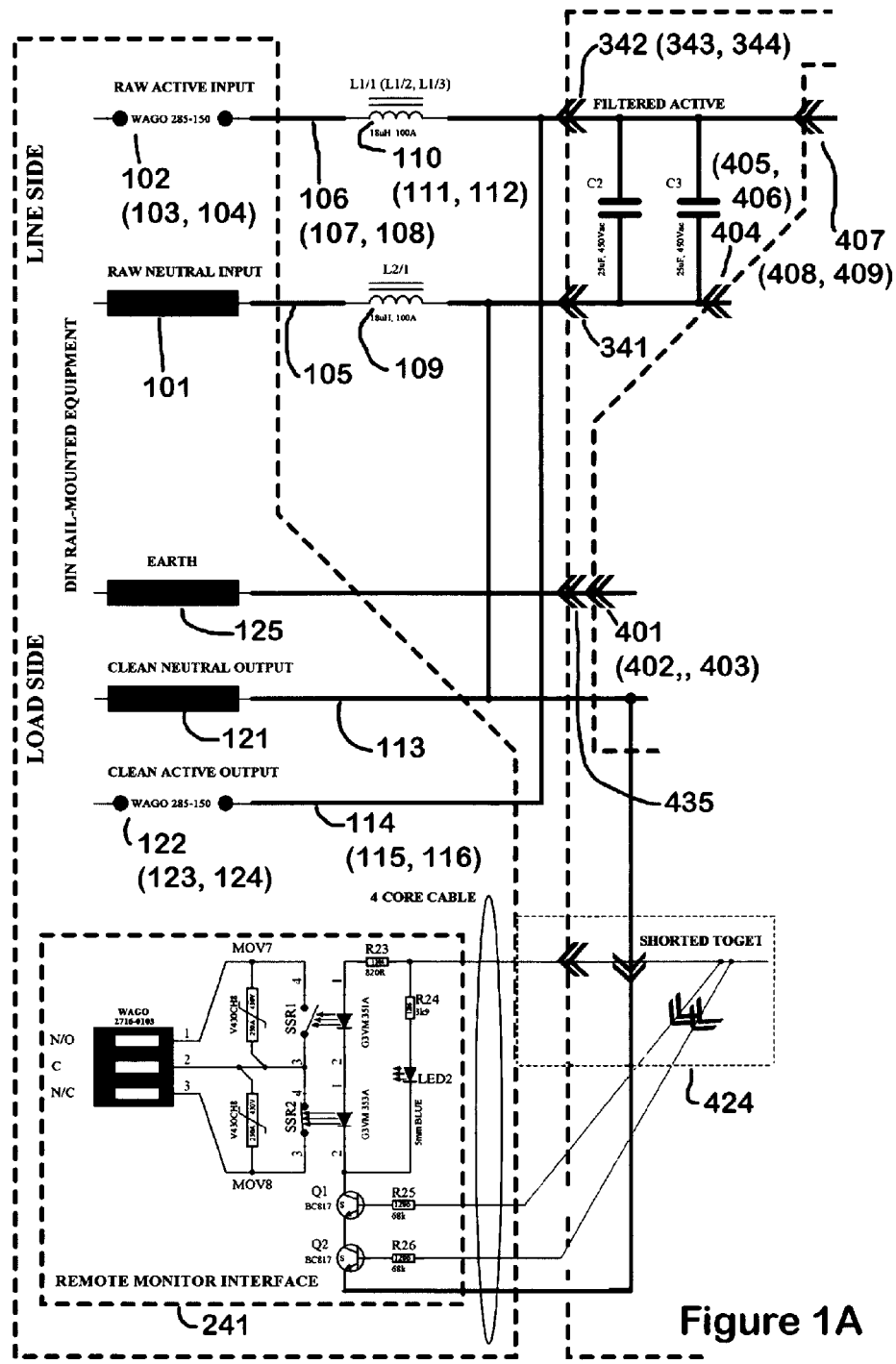
Figure 1B:
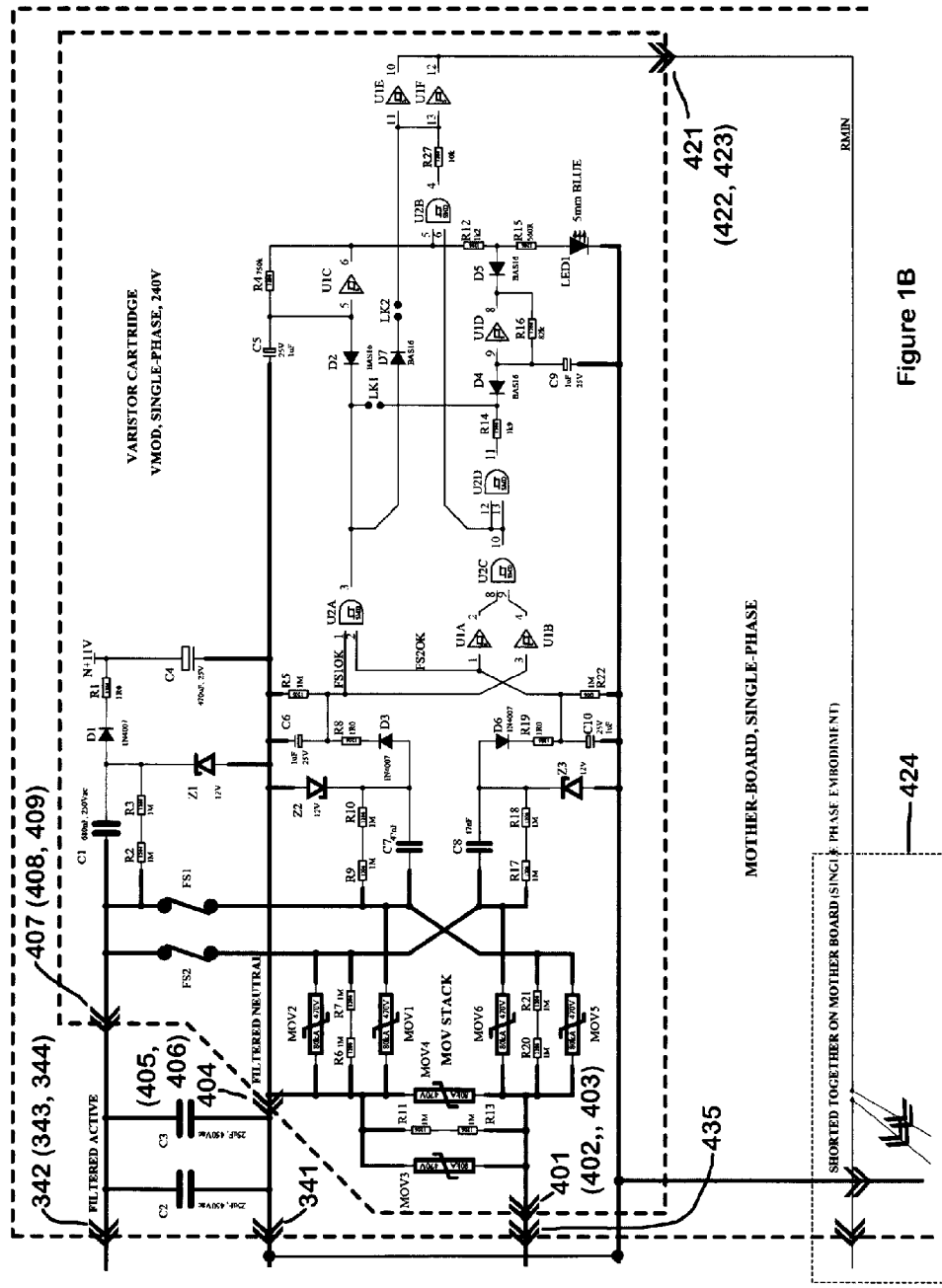
FIG. 1B shows the motherboard and MOV cartridge circuits.

A circuit schematic for a first example of a single phase SRF is illustrated in FIG. 1. A three phase circuit will replicate the components of the single phase circuit three times with the exception that the three phase circuit has phase to phase protection and does not have phase to earth protection and neutral and earth connections and circuits are common to the three phases in the three phase example. The component values may be changed to achieve different voltage and current ratings but the circuit configuration will remain similar.

Customer power wiring is connected to the three-phase SRF by means of 9 'screwless type connectors with direct pressure' (as defined in Appendix D of IEC 60947_1:2004. "Low-voltage switchgear and control gear Part 1: general Rules"), (noting that there are only 5 connections for a single phase system). Screwless type connectors, which accommodate wires up to 50 mm$^2$, are typically used for the clean or filtered side (down stream) connectors. Long upstream feeder line voltage drop requirements in some cases dictate the use of heavier-current conductors and therefore heavier-current connectors for the raw side connections to the SRF than are required for the clean (down stream) side. Screwless type connectors which accommodate wires up to 95 mm$^2$, may be used on the raw side.

Figure 2:
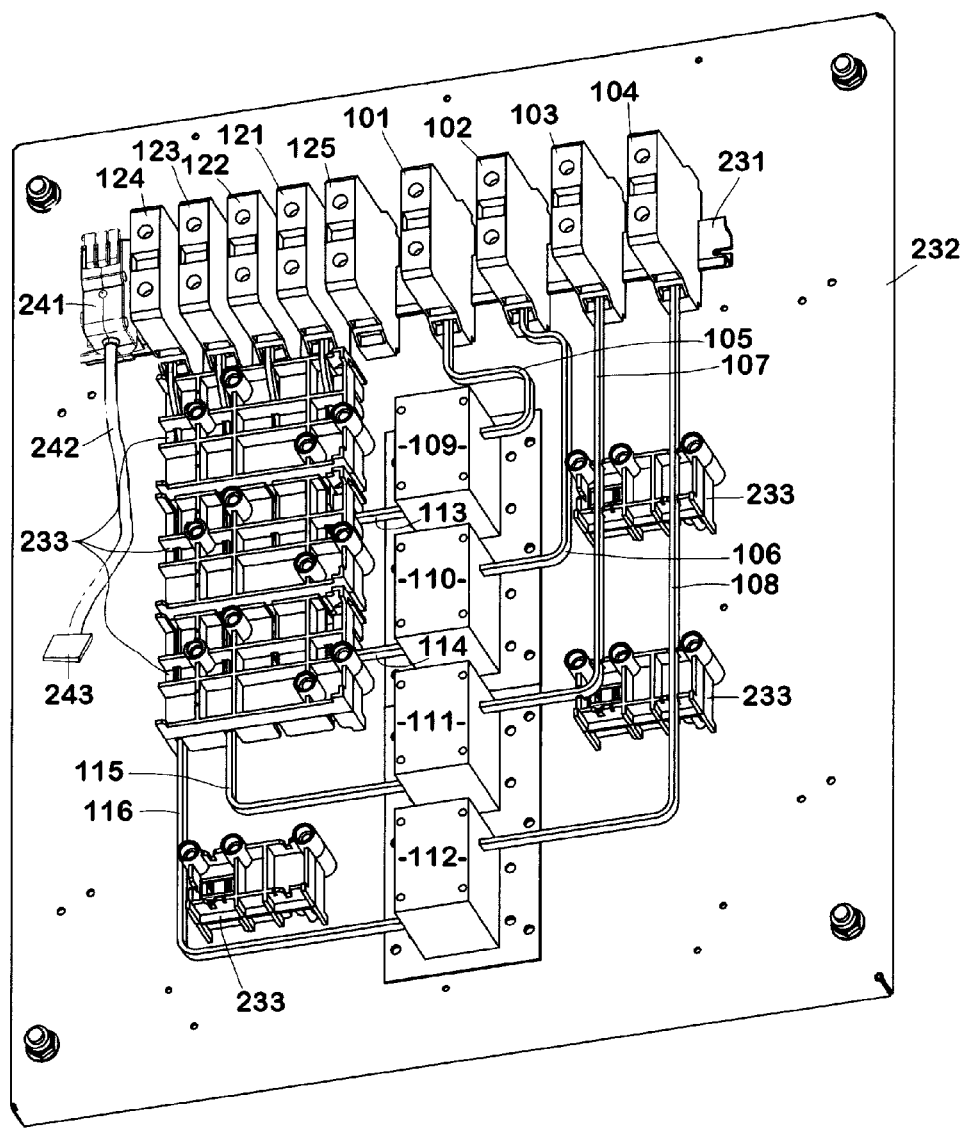
FIG. 2 is a perspective view of a back plate (chassis) with busbars and inductors for a three-phase SRF device of similar design to the single phase device shown in FIG. 1.

Power is input to a raw side neutral connector 101 and a raw side active (or line) connector 102. The raw side connectors 101 and 102 are also seen in FIG. 2, which depicts a bus bar assembly of a 3-phase SRF. In FIG. 2 the Active connector 102 is provided for first phase and connectors 103 & 104 are active connectors for second and third phases. The active connectors 102, 103, 104 and the neutral connector 101 are mounted on a standard DIN rail 231, which is in turn mounted on a metal back-plate 232. An earth connector 125 is also located on the DIN rail 231. In the three phase case the circuits for each of the three phases are similar in topology to that of the single phase (with the exceptions referred to above) and will be described simultaneously below (by inclusion of additional reference numerals where appropriate).

A raw side end 105 of a neutral busbar is connected to the raw side neutral connector 101 and a raw side end 106 (107, 108) of an active busbar is connected to the raw side active connector 102 (103, 104). The raw side end 105 of the neutral busbar is in fact a long tail (input) of a wound (10-30 µH) inductor 109 (L2/1) and the second tail (output) 113 of the inductor 109 forms the clean side end of the neutral busbar and is connected to a clean side neutral connector 121 such that the connection from the raw side neutral connector 101 to the clean side neutral connector 121 is a single piece of solid metal conductor with no intermediate joins or connections. Similarly The raw side end 106 (107, 108) of the active busbar is in fact a long tail (input) of a wound (10-30 µH) inductor (L1/1) 110 (L1/2, L1/3—111, 112) and the second tail (output) 114 (115, 116) of the inductor 110 (111, 112) forms the clean side end of the active busbar and is connected to a clean side active connector 122 (123, 124) such that the connection from the raw side active connector 102 (103, 104) to the clean side active connector 122 (123, 124) is a single piece of solid metal conductor with no intermediate joins or connections. The clean side connectors are also preferably screwless type connectors capable of accommodating up to 50 mm$^2$ conductors. The raw side connectors are also preferably screwless type connectors and will be specified by the customer depending upon the up stream supply line length (e.g. connectors capable of accommodating up to 95 mm$^2$ conductors may be specified if the upstream supply line length is long). By providing a single unbroken conductor between the input (raw side) connectors and the output (clean side) connectors the number of connections is minimised thereby reducing the potential for connector related faults in the power path. Also by using solid conductors in the primary current path, problems associated with connecting stranded conductors are avoided. The inductors 109, 110, 111 & 112 are mounted to the metal back-plate 232, as are the insulation blocks 233 which locate the busbar ends 105, 106, 107, 108, 113, 114, 115 & 116.

The remainder of the circuit of FIG. 1 comprises filter capacitors, MOVs and a status detection and status reporting circuit. The filter capacitors are mounted on the Mother Board (301 of FIG. 3) and the Mother Board is connected directly into the clean side connectors (clean side neutral connector 121, the clean side active connector 122 (123, 124)) and the earth connector 125. The MOVs and a status detection circuit are mounted within a Varistor Cartridge 511 (512, 513—See FIGS. 4 & 5) on a Varistor Cartridge PCB (608 of FIG. 5) and the Varistor Cartridge 511 (512, 513) is connected to the Mother Board 301. A reporting circuit (Remote Monitor Interface) is mounted in a plastic housing 241 located on the DIN rail 231 and connected to the status detection circuit on the Varistor Cartridge PCB 608 via the Mother Board 301 and a cable 242.

Figure 3:
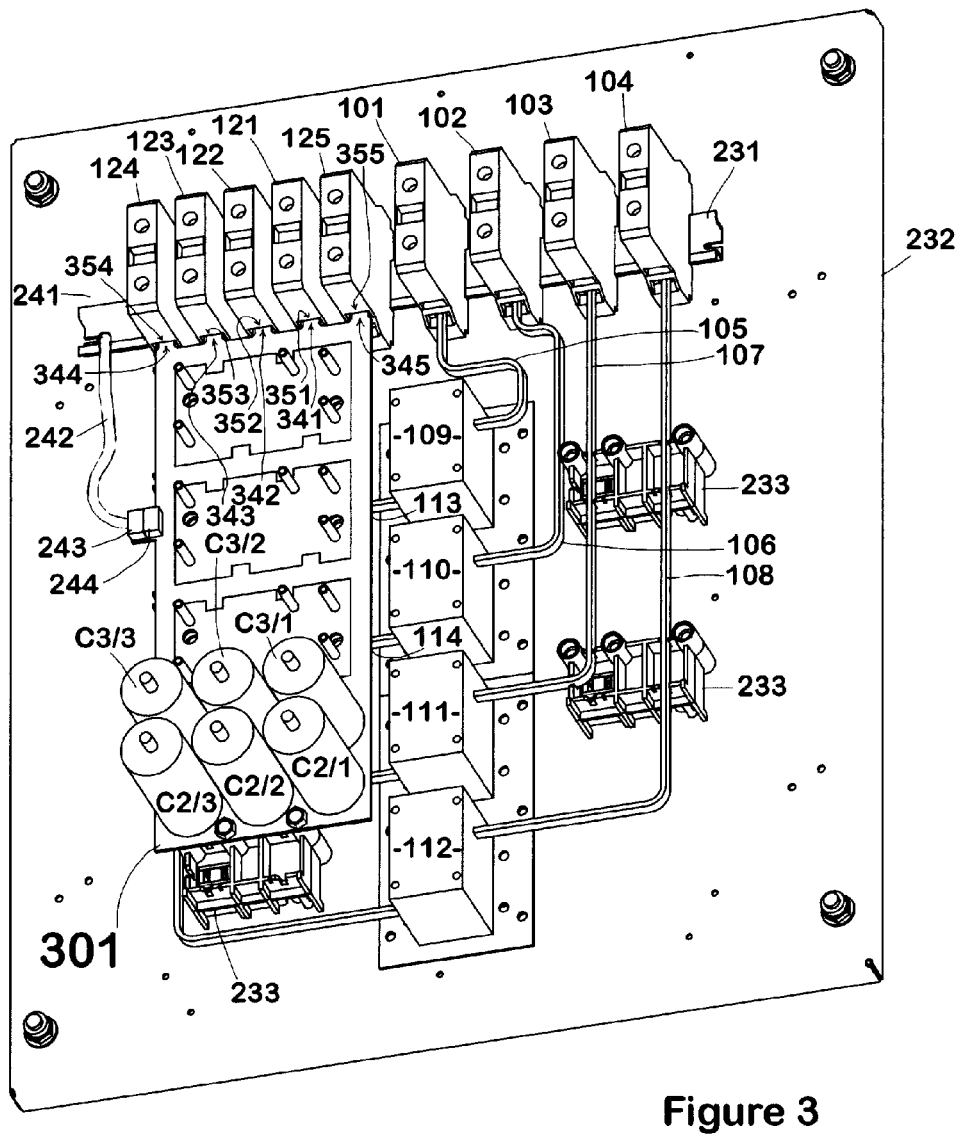
FIG. 3 is a perspective view of the 3-phase hack plate (chassis) of FIG. 2 with a mother board fitted.

Referring to FIG. 3, connection of the Mother Board PCB 301 to the connectors 121, 122, 123, 124 & 125 is via voltage tap input point (351, 352, 353, 354, 355) of each connector using appropriately sized tabs on the Mother Board 301 (i.e. a neutral tab 341, an active tab 342 (343, 344) and an earth tab 345. Double-sided and mirrored 6 oz copper is used on the Mother Board 301, connecting the connection tabs (341, 342, 343, 344, 345) to the other components, to enable the copper traces to carry the expected surge currents. The screwless type connectors (101, 102, 103, 104, 121, 122, 123, 124, 125) used in this embodiment have a tap point above the main connection opening, which are secondary connection points that permit a flat auxiliary conductor to be inserted into the connection point above the main connection point and provided under the same tensioning mechanism as the main connection such that it is clamped with the same clamping force as the main connection to provide reliable connection between the internal conductor of the connector (connecting through to the other side of the connector), the bus bar inserted into the main connector opening and the auxiliary conductor (which is in this case a tab (341, 342, 343, 344, 345) of the Mother Board 301). The voltage tap inputs of the screwless type connectors are not intended to carry the full load current passing through the connector, and are typically used to connect monitoring equipment and the like. In this case the voltage tap inputs must carry intermittent surge currents which might be many times greater than the normal load current supplied through the SRF but will only last for and extremely short period of time.

Capacitors C2 and C3 (C2/1, C3/1, C2/2, C3/2, C2/3 & C3/3 in FIGS. 3 & 4 for the 3-phase embodiment), which may be typically in the range of 10-50 µf, are mounted on the Mother Board and connected between the clean active busbar 114 (115, 116) and the clean neutral busbar 113 to further condition the power after the current passes through the inductors 109 and 110 (111, 112). Bleed resistors (not shown) are provided to discharge the capacitors C2 and C3 (C2/1, C3/1, C2/2, C3/2, C2/3 & C3/3) when power is removed after production testing and serve no purpose in use (unless disconnection of the unit is required at some time).

Figure 4:
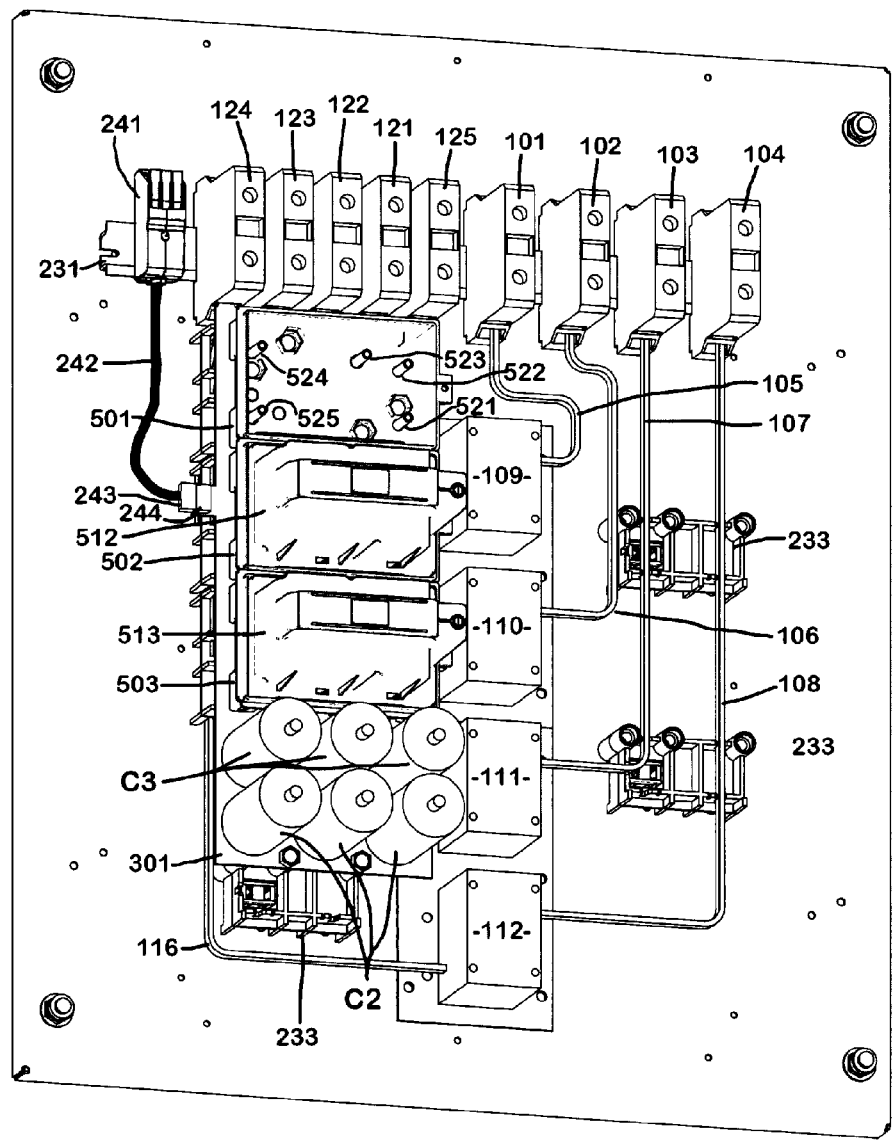
FIG. 4 is a perspective view of the 3-phase back plate (chassis) of FIG. 2 with three cartridge trays fitted and MOV cartridges fitted to two of the cartridge trays.

Referring to FIG. 4, one Varistor Cartridge Tray 501 (502, 503) is mounted on the Mother Board 301 for each phase of the supply. A Varistor Cartridge 511 (one removed in FIG. 5) (512, 513) is carried in each Varistor Cartridge tray 501 (502, 503) and contains the surge protection elements (MOVs) and status monitoring and indicating circuits, which will be described below. The Varistor Cartridge 511 (512, 513) allows hot removal and replacement of the MOVs protecting the load, without disruption of the supply to the load. In the case of a railway signalling system this permits the railway to continue operation while replacement is being performed without danger to rail crews, passengers or maintenance staff. Connection to the circuitry within each Varistor Cartridge 511 (512, 513) is via covered co-operating banana sockets 521, 522, 523, 524 & 525 and plugs 511, 512, 513, 514 & 515 mounted respectively on the Mother Board 301 and an internal PCB 608 of the Varistor Cartridge. The following connection points are provided for each Varistor Cartridge of a 3 phase system:

1) Clean Neutral 404 (405, 406);
2) Earth 401 (402, 403);
3) Clean Active (adjacent phase), (not shown in FIG. 1 which only shows a single phase system);
4) Remote Monitor Signal Output 421 (422, 423);
5) Clean Active 407 (408, 409).

Each of these connection points on the Mother Board are fitted with a socket for a banana plug with the mating plug connected to the circuit in the mating cartridge. Referring to FIG. 4 the banana sockets are illustrated for one phase as follows:

1) Clean Neutral 521;
2) Earth 522;
3) Clean Active (adjacent phase) 523;
4) Remote Monitor Signal Output 524;
5) Clean Active 525.

Location of these connectors on the Mother Board 301 will vary slightly depending on the specification and voltage rating of the SRF to provide keying to prevent connection of an incorrect cartridge.

A locking-type 4-pin connector socket 244 is soldered onto a landing 424 on the Mother Board 301 (seen in FIGS. 3 & 4 and also referenced in FIGS. 1A & 1B) to provide connection of the Remote Monitor Interface. As well as the 3 remote status monitoring signals, a clean neutral is taken out through the 4-pin connector 244 to provide a signal return path. Referring to FIGS. 2, 3 and 4, a 4-pin plug 243 on the free end of a 4-core cable 242 connects the Remote Monitor Interface in housing 241 to the Mother Board 301 via the 4-pin socket 244. The housing 241 mounted on the DIN rail 231 houses the Remote Monitor Interface electronics including the Solid State Relays SSR1 & SSR2 and a triple screwless type connector providing voltage free contacts which can be wired to provide status signals to a remote monitoring system (see FIG. 1).

Figure 5:
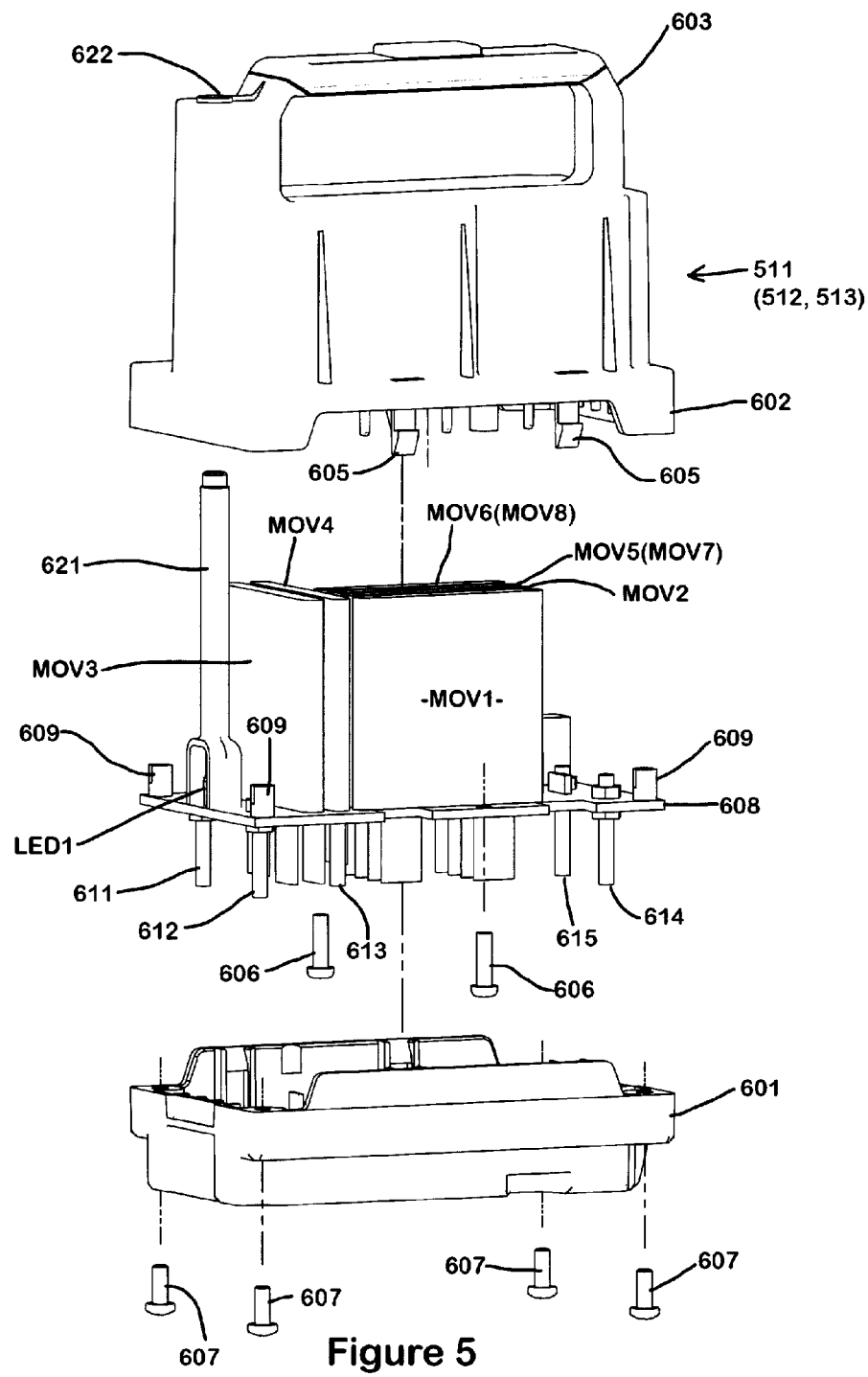
FIG. 5 is an exploded view of a MOV cartridge suitable for the chassis example shown in FIG. 4.
Figure 6:
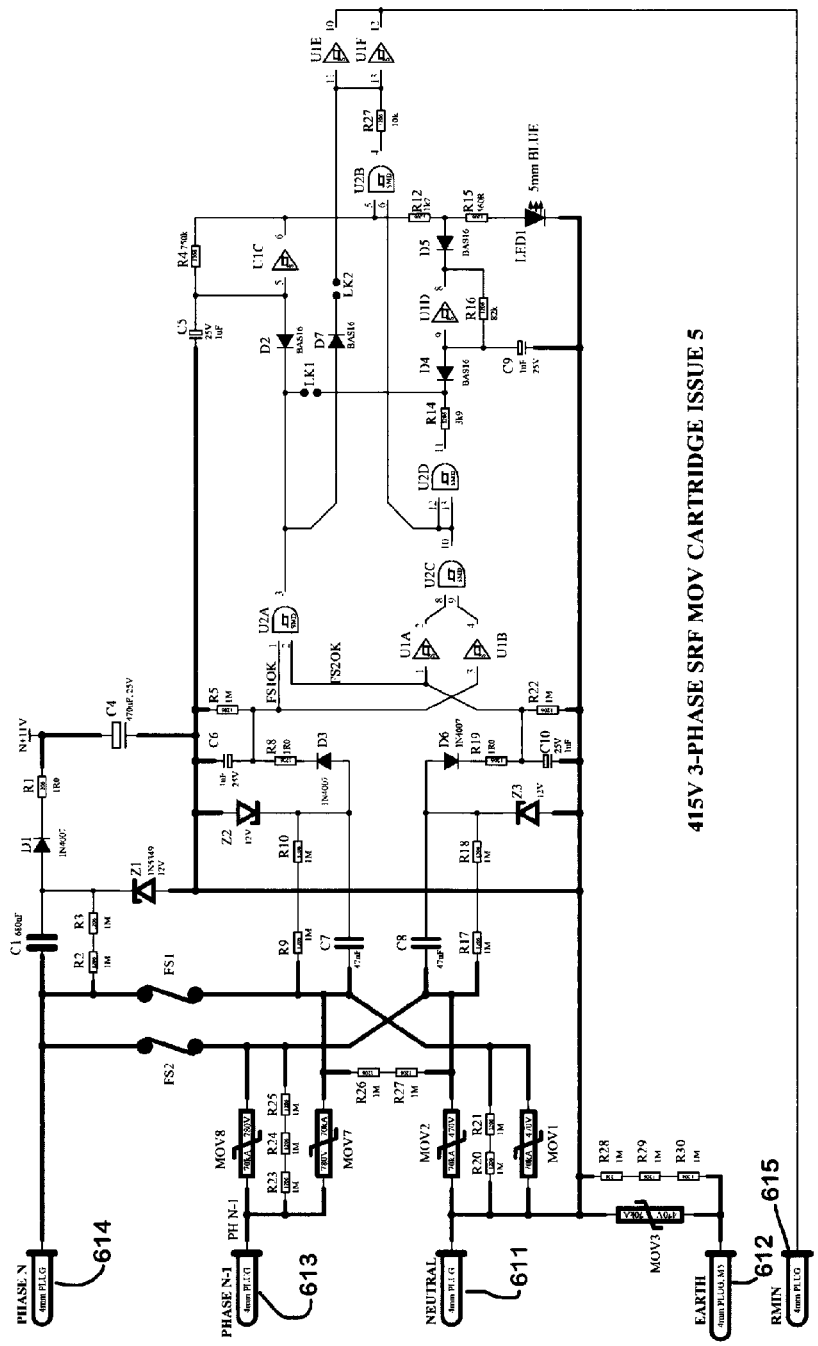
FIG. 6 is a circuit schematic of an example of a MOV cartridge for a three phase system.

Referring to FIG. 5, an exploded view of the Varistor Cartridge 511 (512, 513) for a 3 phase system is illustrated. Three such cartridges are used in a 3 phase system and the cartridge for a 3 phase system is physically similar to a cartridge for a single phase system but has some minor variations related to keying of the cartridge with the tray 501 (502, 503) and the circuit within the cartridge is modified to provide phase to phase surge reduction. The Varistor Cartridge comprises a housing base 601 and housing cover 602 which includes a handle portion 603. The base 601 and cover 602 are joined by resilient clips 605 and screws 607. The screws 607 engage through the PCB 608 within the cartridge, with threaded inserts 609 which are themselves screwed into the cover 602, to secure the base 601 to the cover 602 and locate the PCB between the base 601 and the cover 602. Additional screws 606 hold the PCB to the cover 602 when the base 601 is removed. MOVs and other circuit components are mounted on the Varistor Cartridge PCB 608 as shown in FIG. 6 (the equivalent componentry in FIG. 1 is similarly mounted in a cartridge for a single phase system). LED1 is mounted on an edge of the Varistor Cartridge PCB 608 and a transparent rod 621 is located above LED1 to act as a light pipe. The upper end of the rod 621 projects into the window 622 in the cover 602 to provide a visual indication of the status of the MOVs in the cartridge (using a monitoring scheme as described below)

Banana plugs extend below the Varistor Cartridge PCB 608 to connect with sockets 521, 522, 523, 524 & 525 connected to the Mother Board 301 and which extend through the cartridge tray 501 (502, 503). The circuits connected via these plugs and sockets are set out below:

| | Connection | Socket (tray) | Plug (Cartridge) |
|---|---|---|---|
| 1 | Clean Neutral | 521 | 611 |
| 2 | Earth | 522 | 612 |
| 3 | Clean Active (adjacent phase) | 523 | 613 |
| 4 | Remote Monitor Signal Output | 524 | 614 |
| 5 | Clean Active | 525 | 615 |

The earth plug 612 is physically longer than the other plugs of the cartridge such that this connection makes first and breaks last.

Varistor Cartridges may be for single phase or 3 phase systems and may be rated for 415V, 240V or 120V inputs. The locations of the 415, 240V and 120V inputs on the Mother Board discriminate between 3 phase or single phase and 415, 240 or 120V Varistor Cartridges so that only a correctly specified Varistor Cartridge can be inserted into a particular SRF.

MOV and Status Circuit

The operation of a Varistor Cartridge will now be described with reference to FIGS. 1 and 6. FIG. 1 is a composite electrical schematic drawing for a single phase unit but has been marked with references for equivalent points in the second and third phase circuits of a 3 phase system. However it will be noted with reference to FIG. 6 that although in a three phase system, there are three cartridges, there are some differences in the Varistor Cartridge of a 3 phase system. In particular the cartridge of a 3 phase system includes a phase to phase MOV (Phase N to Phase N−1 in each cartridge). Also in the cartridge of the 3 Phase system, there may be no phase-to-earth MOVs (MOV5 & MOV6) and there may only be only one earth to neutral MOV (MOV3—as each of the 3 cartridges have one of these there are in fact 3 per system).

1) The filtered (clean) active supply 114 is connected to the MOV stack through fuses FS1 and FS2. (The MOV's are arranged so that in each pair connected to one fuse there is a MOV between Active and Neutral and another between Active and Earth). Fuse FS1 monitors MOV 1 and MOV 5 for short circuit while fuse FS2 monitors MOV2 and MOV6.

2) In the 3 phase circuit of FIG. 6, MOV5 & MOV6 are absent and MOV7 and MOV8 provide phase to phase protection between the assigned phase of the cartridge and the adjacent phase. MOV1 and MOV7 in this case are monitored by fuse FS1 and MOV2 and MOV8 are monitored by fuse FS2.

3) In the single phase circuit (FIG. 1) two MOVs (MOV3 and MOV4) are connected between neutral and earth. In the 3 phase case (FIG. 6) MOV4 is omitted as the three SRF cartridges each carry a neutral-to-earth MOV.

4) As described in paragraphs 1)-3) above, there are two MOVs between Active and Neutral, Active and Earth (or phase to phase) and one or two MOVs between Neutral to Earth. This arrangement provides redundancy such that in the event that one MOV in any pair becomes unserviceable (and the corresponding fuse operates) a second MOV remains to protect the supply until the Varistor Cartridge can be replaced.

5) The circuit comprising capacitor C1, zener diode Z1, diode D1, resistors R1, R2, R3 and capacitor C4 is a voltage limited half-wave rectifier and filter that supplies dc power to the B-series CMOS Schmitt Trigger input logic element packages U1 and U2 ("N+11V").

6) Capacitor C1 acts as a capacitive voltage dropper that limits the maximum current through Z1 to within its rating. For the purposes of protecting Testing Staff from high-voltage shocks, R2 and R3 discharge C1 after production testing, they serve no function during normal operation.

7) Resistor R1 limits the maximum forward surge current through diode D1 to a value within the rating of the diode.

8) Diode D1 itself prevents capacitor C4 from being discharged on negative half-cycles of the filtered mains during which the zener diode Z1 becomes forward-biased, such that its cathode is pulled down to about −700 mV with respect to Filtered Neutral 113.

9) Two identical fuse monitoring circuits are provided, one for each fuse. The circuit that monitors fuse FS1 comprises capacitor C7, zener diode Z2, diode D3, resistors R5, R8, R9, R10 and capacitor C6. The circuit that monitors fuse FS2 is made-up of C8, zener diode Z3, diode D6, resistors R17, R18, R19, R22 and capacitor C10. The topology of both these circuits is identical to that of the "N+11V" power supply circuit already discussed; the only differences are in the values of the dropping capacitors C7 and C8, and the bleeder resistors shunting the output capacitors C6 and C10. The circuits independently produce the logic signals FS1OK and FS2OK that in the active HI state indicate that fuses FS1 and FS2 respectively are intact.

10) Inverter U1C, diode D2, capacitor C5 (1 μF) and resistor R4 form an on/off-controlled oscillator having a frequency of about 1 Hz with a duty cycle of close to 50%. Inverter U1D, diode D4, capacitor C9 and resistor R16 form another such oscillator running at about 5 Hz with the same sort of duty cycle.

11) Under normal circumstances when the Varistor Cartridge 511 (512, 513) is fully populated for dual MOV redundancy, a link LK1 will be left open circuit, and with both fuses intact signals FS1OK and FS2OK are both HI. So the output of NAND gate U2A is LO thus driving Inverter U1C's input LO through diode D2 to disable the 1 Hz oscillator, and drive the output of Inverter U1C HI.

12) Inverters U1A and U1B and NAND gate U2C form a simple equivalent OR gate whose output is inverted by inverter-wired NAND gate U2D. Because signals FS1OK and FS2OK are both normally HI, the output of gate U2C will also be HI and the output of gate U2D will be LO. This LO signal out of gate U2D will pull the input of inverter U1D LO through resistor R14 and diode D4 thereby disabling the 5 Hz oscillator. The HI at the output of Inverter U1D reverse-biases diode D5 so that it effectively disconnects the output of Inverter U1D from the junction of resistors R12 and R15. (Because R14 is much less than R16, the LO at the output of NAND gate U2D will pull the input of Inverter U1D well down below its positive-going threshold).

13) The HI at the output of Inverter U1C thus energises LED1 through resistor R12 and R15 and LED1 glows steadily.

14) The HI levels at the outputs of Inverter U1C and NAND gate U2C drive the output of NAND gate U2B LO. This is inverted to HI by Inverters U1E and U1F to become the logic signal RMIN. Inverters U1E and U1F are shunted together in order to double the drive capability of RMIN.

15) Therefore in the normal condition with both fuses FS1 and FS2 intact, LED1 glows steadily and RMIN is HI.

16) In the event of the Cartridge intercepting a transient that over stresses one of the MOV's to the extent that it becomes short circuit, the fuse monitoring that particular MOV will operate and the now faulty MOV will be isolated.

17) As an example, assume that MOV 1 has failed to a short circuit.

18) Fuse FS1 operates and becomes open circuit. After a few seconds, signal FS1OK falls below the negative-going threshold of NAND gate U2A pin 1 and the output of NAND gate U2A will be driven HI.

19) Diode D2 is thus reverse-biased thereby removing the LO level at the input of Inverter U1C and allowing capacitor C5 to charge through resistor R4.

20) When the voltage at the input of Inverter U1C rises above its positive-going threshold, its output is forced LO. Capacitor C5 now discharges through resistor R4 until its voltage again falls below the negative-going threshold of Inverter U1C, whereupon its output is driven HI and the whole cycle starts over again.

21) (Meanwhile, there has been no change of logic state at the output of NAND gate U2C because signal FS2OK is still HI meaning that the 5 Hz oscillator is still disabled.)

22) The 1 Hz rectangular wave at the output of Inverter U1C causes LED1 to flash at that rate indicating that a MOV inside that Cartridge has failed, the level of protection has been degraded and the Cartridge should be replaced. (However, the second MOV in the affected pair (MOV2 in this example) is still in service and the load is still protected).

23) Signal RMIN will also oscillate at 1 Hz and drive the Remote Monitor Interface accordingly.

24) Should another equally destructive transient strike and cause fuse FS2 to also rupture, signal FS2OK soon falls to a LO level and the output of NAND gate U2C will be driven LO. The output of NAND gate U2D responds by going HI, reverse-biasing diode D4 and allowing the 5 Hz oscillator to run. Now both oscillators are running.

25) When the rectangular wave now at the output of Inverter U1D is LO, diode D5 is forward-biased and the junction of resistors R12 and R15 is pulled-down to such a level as would prevent LED1 from glowing even if Inverter U1C was trying to turn it on. So the situation were both fuses have operated is indicated by LED1 flashing 5 times in the first (HI) half of a 1 Hz oscillator cycle, and staying dark for the second half. This kind of flashing activity is from now on called the "burst" pattern.

26) The LO that now appears at the output of NAND gate U2C drives the output of NAND gate U2B HI and therefore signal RMIN is driven LO.

Remote Monitor Interface

27) The (optional) Remote Monitor Interface assembly is designed to be deployed in either single- or 3-phase SRF's. Its specific purpose is to provide a means of reporting to some off-site location the condition of the Varistor Cartridge and hence the level of protection of the load connected to the SRF.

28) In the single-phase case as depicted, the 3 independent inputs to the Remote Monitor Interface are shorted together. So when signal RMIN is LO, NPN bipolar junction transistors Q1 and Q2 are both cut-off and the voltage at the junction of resistors R23 and R24 is zero, hence there is no path for current through LED2 or through the input LED's of solid state relays SSR1 and SSR2, whose respective output contacts are in their de-energised states.

29) When signal RMIN is HI, NPN transistors Q1 and Q2 are both saturated, and the junction of resistors R23 and R24 is connected to N+11V. Current can now flow through LED2 and the input LEDs of the solid state relays SSR1 and SSR2 so LED2 glows and the output contacts of solid state relays SSR1 and SSR2 are driven into their respective energised states.

30) The truth table presented below summarises the behaviour of LED1 and signal RMIN in response to all combinations of fuse states for a fully equipped dual redundancy Varistor Cartridge.

| FS1 (FS1OK) | FS2 (FS2OK) | LED1 PATTERN | RMIN/LED2 |
|---|---|---|---|
| OPERATED | OPERATED | BURST | OFF |
| OPERATED | INTACT | 1 Hz FLASH | ON/OFF at 1 Hz |
| INTACT | OPERATED | 1 Hz FLASH | ON/OFF at 1 Hz |
| INTACT | INTACT | ON STEADY | ON STEADY |

Half-Equipped Varistor Cartridge

31) Provision is made for Varistor Cartridges to be fitted with single MOV's between Active and Neutral, Active and Earth and Neutral and Earth by omitting MOV2, MOV4 and MOV5 (or Active to Active by omitting MOV8). (Although both fuses are installed, only that which monitors the single Varistor Stack (FS1) is ever likely to blow, FS2 just drives FS2OK HI).

32) In this case the shorting link LK1 must be fitted causing the behaviour of LED1 to differ slightly in that it can now only display the Burst pattern when FS1 has operated.

33) Link LK1 shorts the cathode of diode D4 to the output of NAND gate U2A. This combined with resistor R14 being in series with the output of NAND gate U2D hands control of the 5 Hz oscillator to NAND gate U2A.

34) If both fuses are intact then LED1 glows steadily and signal RMIN is a constant HI, as for the fully equipped case.

35) If either fuse operates, the output of NAND gate U2A will become HI and diodes D2 and D4 will both be reverse-biased and both oscillators will run, thus resulting in LED1 displaying the Burst pattern, the behaviour of signal RMIN is unaffected by LK1 being installed (see the truth table below).

| FS1 (FS1OK) | FS2 (FS2OK) | LED1 PATTERN | RMIN/LED2 |
|---|---|---|---|
| OPERATED | OPERATED | BURST | OFF |
| OPERATED | INTACT | BURST | FLASH |
| INTACT | OPERATED | BURST | FLASH |
| INTACT | INTACT | ON STEADY | ON STEADY |

36) In some situations, like where an un-snubbed inductive device is connected to the RMI's volt-free contacts (a Q-style relay for instance), high levels of back emf induced by continual ON/OFF periodic switching may upset nearby electronic systems.

37) Installing link LK2 disables the flashing of the signal RMIN in favour of the OFF pattern as follows.

38) Link LK2 connects the cathode of diode D7 to the inputs of Inverters U1E and U1F.

39) When both fuses FS1 and FS2 are intact, the output of NAND gate U2A is LO so diode D7 is reverse-biased.

40) If either fuse FS1 or FS2 operates, the resulting HI on the output of NAND gate U2A forward-biases diode D7 which now connects that HI to the inputs of U1E and U1F and signal RMIN is driven LO (OFF).

41) A summary of the behaviour of RMIN/LED2 and LED1 in response to the states of LK1 and LK2 is tabulated below. In this arrangement, Link LK1 determines the level of protection and Link LK2 determines whether RMIN is allowed to oscillate and LED1 is allowed to flash.

| LK1 | LK2 | FUSES | RMIN LED2 | LED1 | RMIN, LED2 FLASHING | PROTECTION LEVEL |
|---|---|---|---|---|---|---|
| OUT | OUT | INTACT | ON | ON | ENABLED | DUAL VARISTOR STACK REDUNDANCY |
|  |  | ONE OPERATED | FLASH | FLASH |  |  |
|  |  | BOTH OPERATED | OFF | BURST |  |  |
|  | IN | INTACT | ON | ON | DISABLED |  |
|  |  | ONE OPERATED | OFF | FLASH |  |  |
|  |  | BOTH OPERATED | OFF | BURST |  |  |
| IN | OUT | INTACT | ON | ON | ENABLED | SINGLE VARISTOR STACK |
|  |  | ONE OPERATED | FLASH | BURST |  |  |
|  |  | BOTH OPERATED | OFF | BURST |  |  |
|  | IN | INTACT | ON | ON | DISABLED |  |
|  |  | ONE OPERATED | OFF | BURST |  |  |
|  |  | BOTH OPERATED | OFF | BURST |  |  |

Example 2

An alternative circuit schematic for a second example of a single phase SRF is illustrated in FIG. 7. As with the FIG. 1 example, a three phase circuit will replicate the components of the single phase circuit three times with the exception that the three phase circuit has phase to phase protection and does not have phase to earth protection and neutral and earth connections and circuits are common to the three phases in the three phase example. As with the previous example, component values may be changed to achieve different voltage and current ratings but the circuit configuration will remain similar.

Figure 7A:
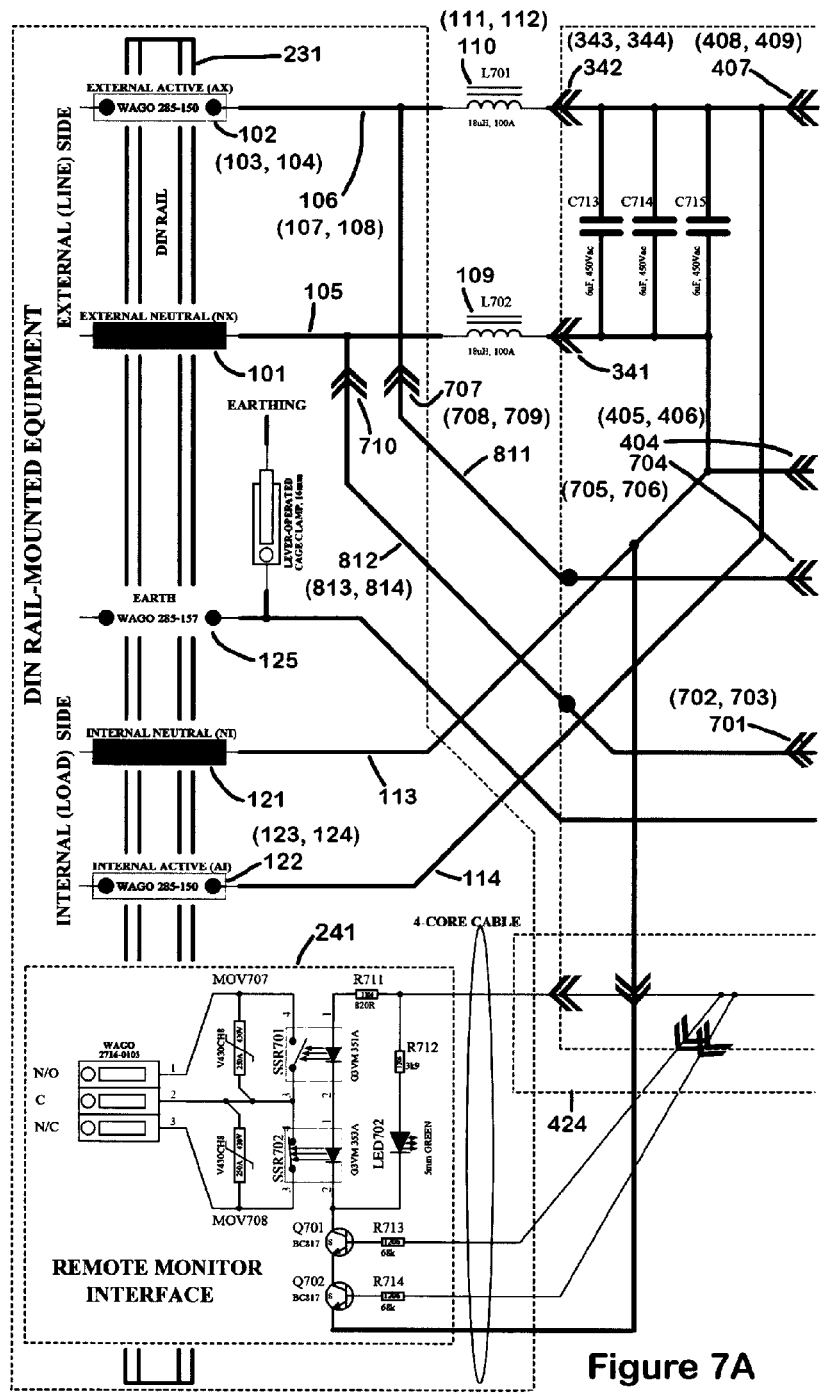
Figure 7B:
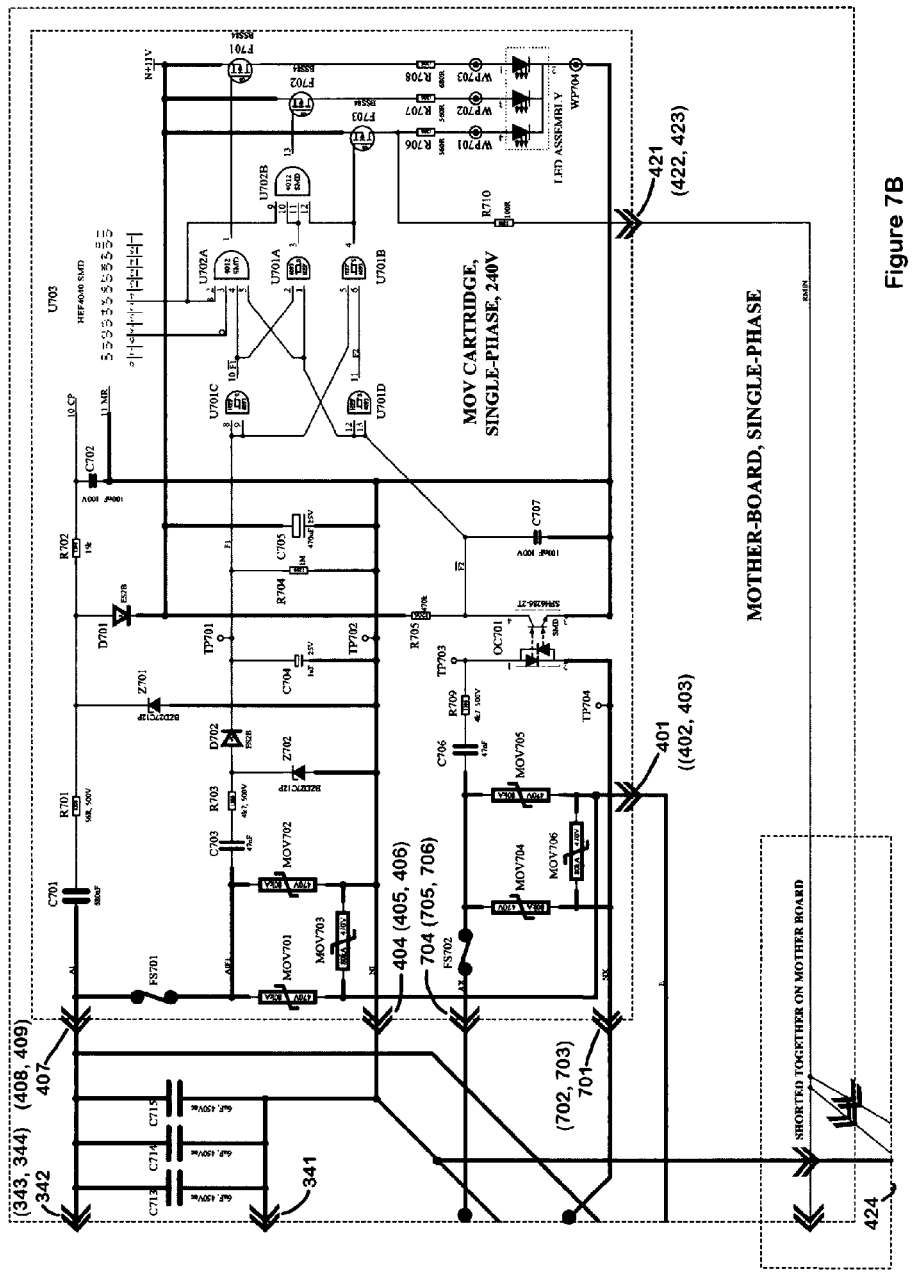
FIG. 7B shows the motherboard and MOV cartridge circuits.

The same chassis arrangement of FIG. 2 is used in this second example but the mother board and an auxiliary circuit board attached to the chassis (see FIG. 8) are different to achieve the altered circuit arrangement of FIGS. 7A & 7B (or its 3-phase equivalent). As seen in FIG. 2 customer power wiring is connected to the three-phase SRF by means of 9 'screwless type connectors with direct pressure' (as defined in Appendix D of IEC 60947_1:2004. "Low-voltage switchgear and control gear Part 1: general Rules"), (noting that there are only 5 connections for a single phase system). Screwless type connectors, which accommodate wires up to 50 mm², are typically used for the clean or filtered side (down stream) connectors. Long upstream feeder line voltage drop requirements in some cases dictate the use of heavier-current conductors and therefore heavier-current connectors for the raw side connections to the SRF than are required for the clean (down stream) side. Screwless type connectors which accommodate wires up to 95 mm², may be used on the raw side.

The description of FIG. 2 above will not be repeated here as the components of FIG. 2 are essentially the same for both examples.

The remainder of the circuit of FIG. 7 comprises filter capacitors, MOVs and a status detection and status reporting circuit. The filter capacitors are mounted on the Mother Board (801 of FIG. 8) and the Mother Board is connected directly into the clean side connectors (clean side neutral connector 121, the clean side active connector 122 (123, 124) and the earth connector 125). Additionally an auxiliary circuit hoard 802 is connected to the raw side connectors (raw side neutral connector 101, the raw side active connector 102 (103, 104)). The MOVs and a status detection circuit are mounted within a Varistor Cartridge 911 (912, 913—See FIGS. 9 & 10) on a Varistor Cartridge PCB (1008 of FIG. 10) and the Varistor Cartridge 911 (912, 913) is connected to the Mother Board 801. A reporting circuit (Remote Monitor Interface) is mounted in a plastic housing 241 located on the DIN rail 231 and connected to the status detection circuit on the Varistor Cartridge PCB 1008 via the Mother Board 801 and a cable 242.

Figure 8:
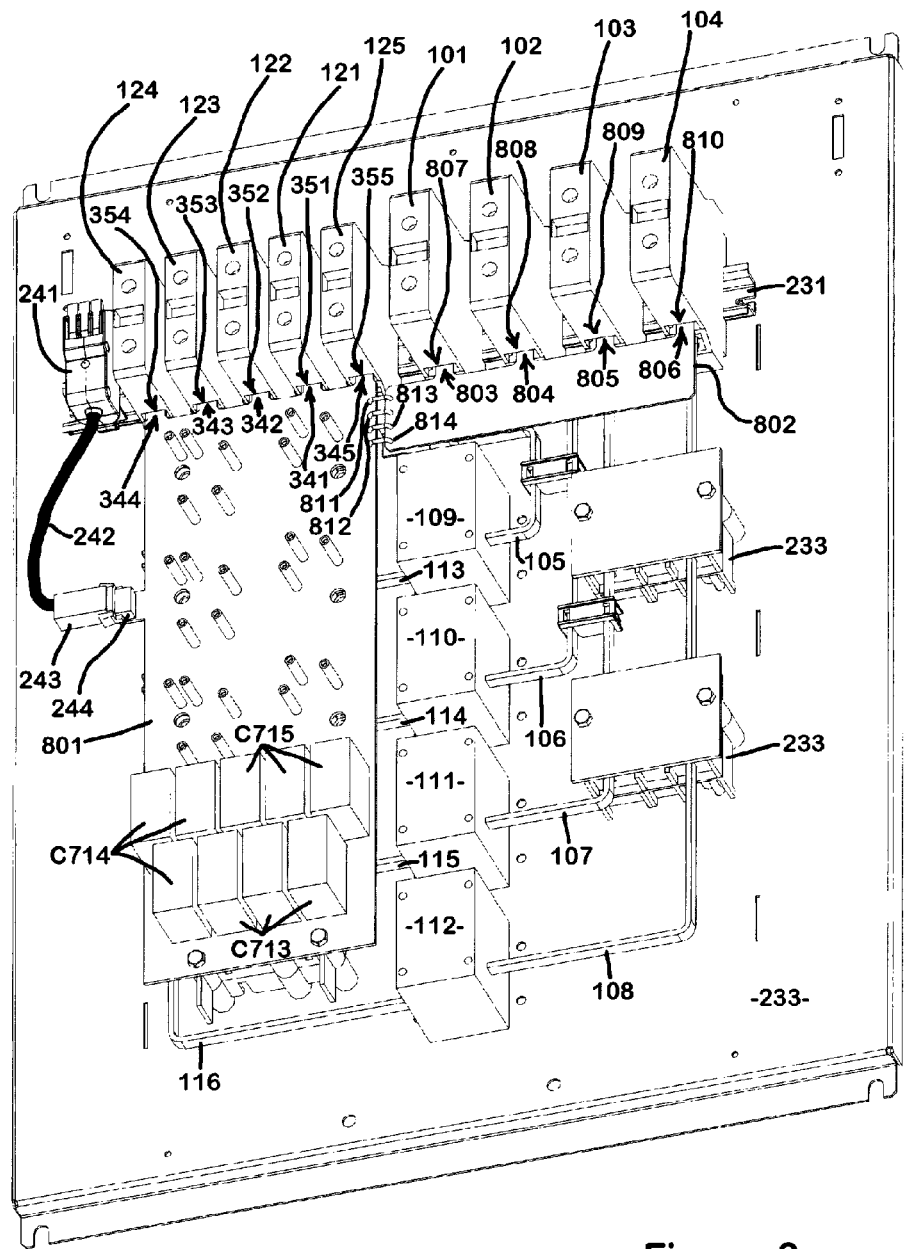
FIG. 8 is a perspective view of the 3-phase back plate (chassis) of FIG. 2 with a mother board and auxiliary board fitted in accordance with an alternative protection arrangement which is illustrated for the single phase case (for simplicity) in the schematic of FIGS. 7A and 7B.

Referring to FIG. 8, connection of the Mother Board PCB 801 to the connectors 121, 122, 123, 124 & 125 is via voltage tap input point (351, 352, 353, 354, 355) of each connector using appropriately sized tabs on the Mother Board 301 (i.e. a neutral tab 841, an active tab 842 (843, 844) and an earth tab 845). Tracks 10 mm wide of 4 oz copper are used on the Mother Board 801, connecting the connection tabs (841, 842, 843, 844, 845) to the other components, to enable the copper traces to carry the expected surge currents. As with the first example, the screwless type connectors (101, 102, 103, 104, 121, 122, 123, 124, 125) used in this embodiment have a tap point above the main connection opening, which are secondary connection points that permit a flat auxiliary conductor to be inserted into the connection point above the main connection point and provided under the same tensioning mechanism as the main connection such that it is clamped with the same clamping force as the main connection to provide reliable connection between the internal conductor of the connector (connecting through to the other side of the connector), the bus bar inserted into the main connector opening and the auxiliary conductor (which is in this case a tab (841, 842, 843, 844, 845) of the Mother Board 801). The voltage tap inputs of the screwless type connectors are not intended to carry the full load current passing through the connector, and are typically used to connect monitoring equipment and the like. In this case the voltage tap inputs must carry intermittent surge currents which might be many times greater than the normal load current supplied through the SRF but will only last for and extremely short period of time.

Figure 9:
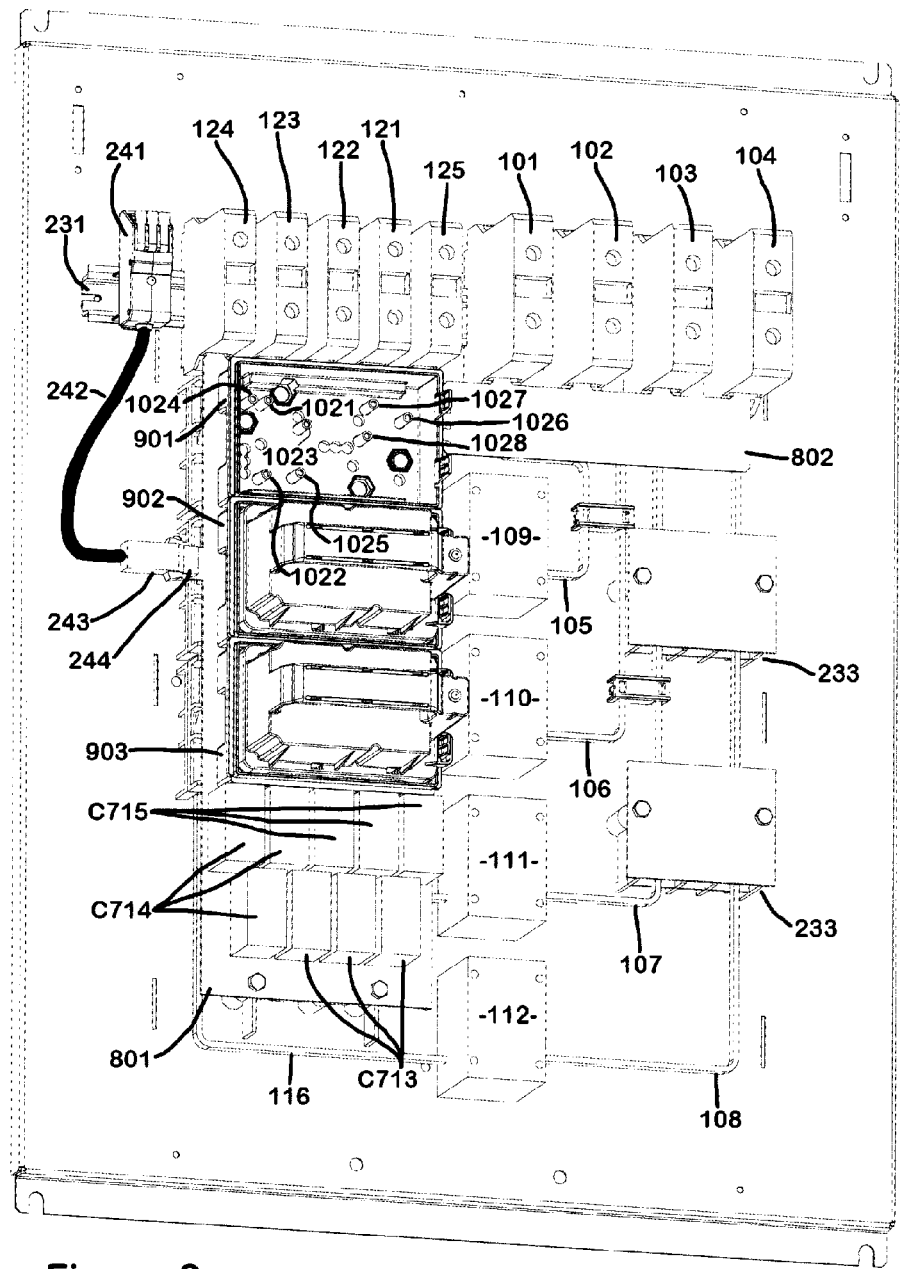
FIG. 9 is a perspective view of the 3-phase back plate (chassis) of FIG. 8 with three cartridge trays fitted and MOV cartridges fitted to two of the cartridge trays.

Referring to FIGS. 7A & 7B, Capacitors C713, C714 and C715 (three each of capacitors C713, C714, C715 will be required in the 3 phase example as seen in FIGS. 8 & 9), which may be typically in the range of 5-50 µf, are mounted on the Mother Board 801 and connected between the clean active busbar 114 (115, 116) and the clean neutral busbar 113 to further condition the power after the current passes through the inductors 109 and 110 (111, 112).

Figure 11:
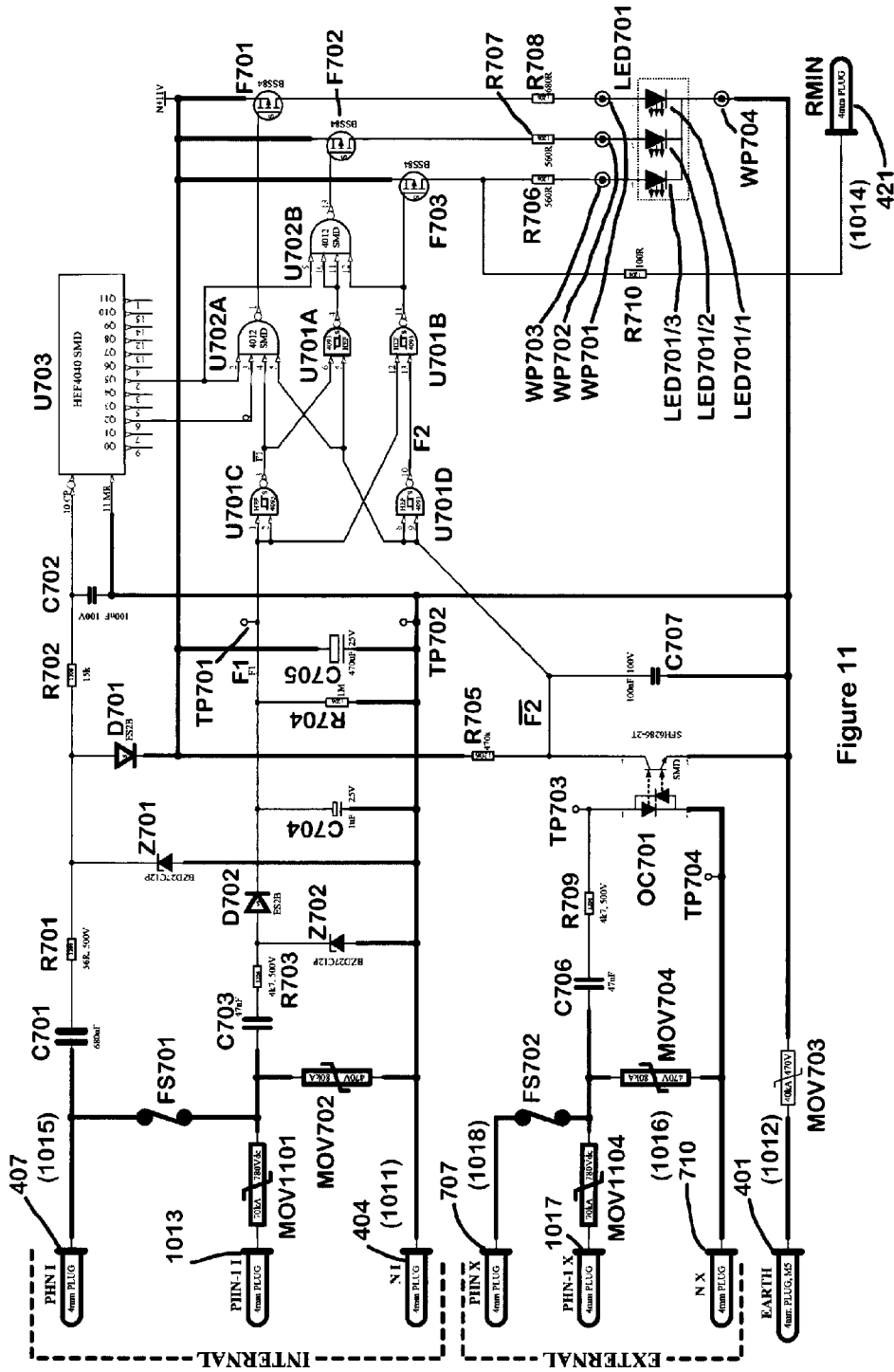
FIG. 11 is a circuit schematic of a 3-phase MOV cartridge which would be used in a 3-phase equivalent of the alternative single phase system shown in FIGS. 7A & 7B

Referring to FIG. 9, one Varistor Cartridge Tray 901 (902, 903) is mounted on the Mother Board 801 for each phase of the supply. Identical Varistor Cartridges 911 (912, 913) (one removed in FIG. 9) are carried in each Varistor Cartridge tray 901 (902, 903) and each contains the surge protection elements (MOVs) and status monitoring and indicating circuits, which will be described below. The Varistor Cartridge 911 (912, 913) allows hot removal and replacement of the MOVs protecting the load, without disruption of the supply to the load. In the case of a railway signalling system this permits the railway to continue operation while replacement is being performed without danger to rail crews, passengers or maintenance staff. Connection to the circuitry within each Varistor Cartridge 911 (912, 913) is via covered co-operating banana sockets 1021, 1022, 1023, 1024 1025, 1026, 1027 & 1028 and plugs 1011, 1012, 1013, 1014 1015, 1016, 1017 & 1018 mounted respectively on the Mother Board 801 and an internal PCB 1008 of the Varistor Cartridge 911 (912, 913). Referring to FIG. 7B, the following connection points are provided for each Varistor Cartridge of a 3 phase system:

1) Clean Neutral 404 (405, 406);
2) Earth 401 (402, 403);
3) Remote Monitor Signal Output 421 (422, 423);
4) Clean Active 407 (408, 409).
5) Raw Neutral 701 (702, 703);
6) Raw Active 704 (705, 706).
7) Clean Active (adjacent phase—3 phase only) 1108 (1109, 1110), (see FIG. 11—not shown in FIGS. 7A & 7B which only shows a single phase system);
8) Raw Active (adjacent phase) 1111 (1112, 1113), (see FIG. 11—not shown in FIGS. 7A & 7B which only shows a single phase system);

Each of these connection points on the Mother Board are fitted with a socket for a banana plug with the mating plug connected to the circuit in the mating cartridge. Referring to FIG. 9 the banana sockets are illustrated for one phase as follows:

1) Clean Neutral 1021;
2) Earth 1022;
3) Clean Active (adjacent phase) 1023;
3) Remote Monitor Signal Output 1024;
54) Clean Active 1025.
5) Raw Neutral 1026;
7) Raw Active (adjacent phase) 1027;
6) Raw Active 1028.

Location of these connectors on the Mother Board 801 will vary slightly depending on the specification and voltage rating of the SRF to provide keying to prevent connection of an incorrect cartridge.

As with the previous example a locking-type 4-pin connector socket 244 is soldered onto a landing 424 on the Mother Board 801 to provide connection of the Remote Monitoring Interface. As well as the 3 remote status monitoring signals, a clean neutral is taken out through the 4-pin connector 244 to provide a signal return path. Referring to FIGS. 2, 8 and 9, a 4-pin plug 243 on the free end of a 4-core cable 242 connects the Remote Monitor Interface in housing 241 to the Mother Board 801 via the 4-pin socket 244. The housing 241 mounted on the DIN rail 231 houses the Remote Monitor Interface electronics including the Solid State Relays SSR1 & SSR2 and a triple screwless type connector providing voltage free contacts which can be wired to provide status signals to a remote monitoring system (see FIG. 1).

Figure 10:
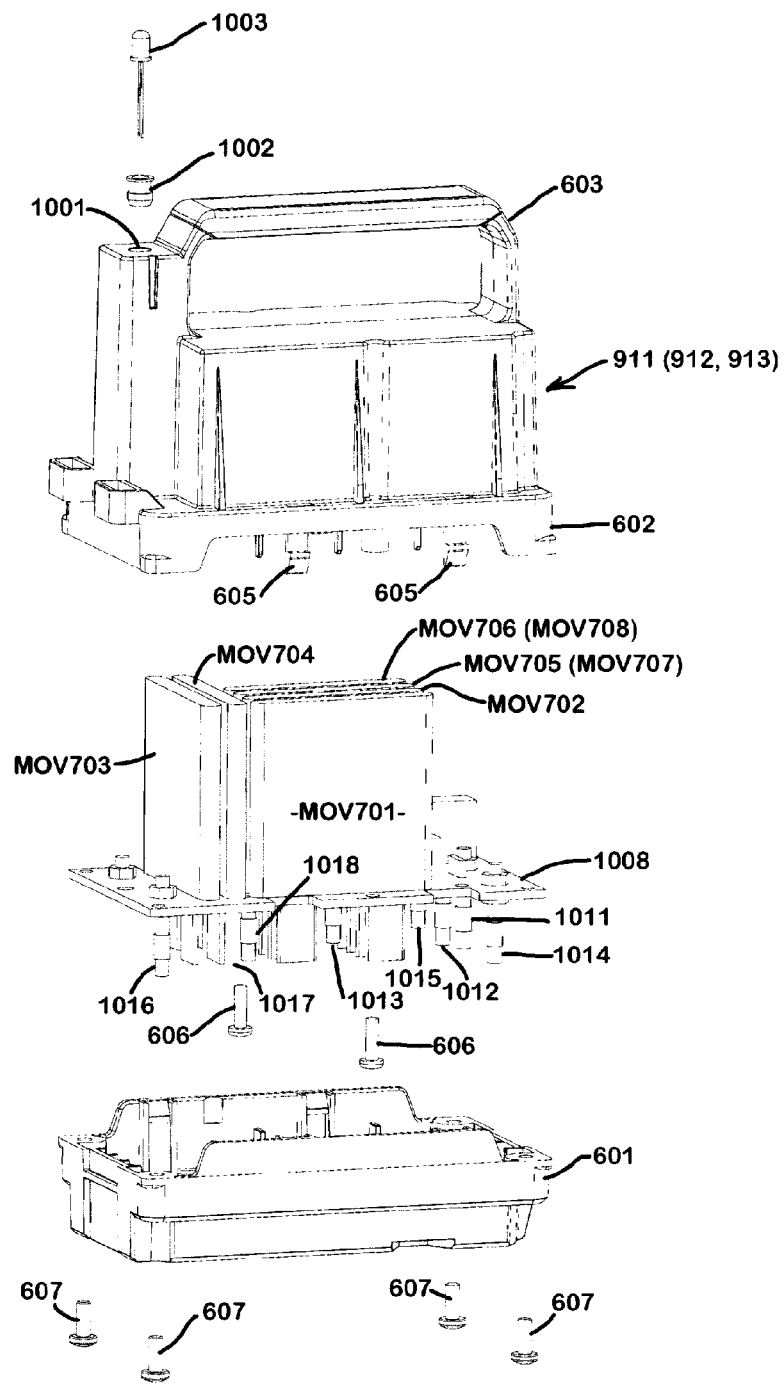
FIG. 10 is an exploded view of a MOV cartridge suitable for the chassis example shown in FIG. 9.

Referring to FIG. 10, an exploded view of the Varistor Cartridge 911 (912, 913) for a 3 phase system is illustrated. Three such cartridges are used in a 3 phase system and the cartridge for a 3 phase system is physically similar to a cartridge for a single phase system but has some minor variations related to keying of the cartridge with the tray 901 (902, 903) and the circuit within the cartridge is modified to provide phase to phase surge reduction. The Varistor Cartridge 911, 912, 913 comprises a housing base 601 and housing cover 602 which includes a handle portion 603. The base 601 and cover 602 are joined by resilient clips 605 and screws 607. The screws 607 engage through the PCB 1008 within the cartridge, with threaded inserts 609 which are themselves screwed into the cover 602, to secure the base 601 to the cover 602 and locate the PCB between the base 601 and the cover 602. Additional screws 606 hold the PCB to the cover 602 when the base 601 is removed. MOVs and other circuit components are mounted on the Varistor Cartridge PCB 1008 as shown in FIG. 10 (the equivalent componentry in FIG. 7 is similarly mounted in a cartridge for a single phase system). A LED package 1003 (LED701 in FIG. 7B) is mounted in a hole 1001 in the casing 602 via a collet 1002 and connected to the Varistor Cartridge PCB 1008 via a cable (not shown). The LED package 1003 provides a visual indication of the status of the fuses in the cartridge (using a monitoring scheme as described below).

Banana plugs extend below the Varistor Cartridge PCB 1008 to connect with sockets 1021, 1022, 1023, 1024, 1025, 1026, 1027 & 1028 (not all required in the single phase case) connected to the Mother Board 801 and which extend through the cartridge tray 901 (902, 903). The circuits connected via these plugs and sockets are set out below:

| | Connection | Socket (tray) | Plug (Cartridge) |
|---|---|---|---|
| 1 | Clean Neutral | 1021 | 1011 |
| 2 | Earth | 1022 | 1012 |
| 3 | Clean Active (adjacent phase) | 1023 | 1013 |
| 4 | Remote Monitor Signal Output | 1024 | 1014 |
| 5 | Clean Active | 1025 | 1015 |
| 6 | Raw Neutral | 1026 | 1016 |
| 7 | Raw Active (adjacent phase) | 1027 | 1017 |
| 8 | Raw Active | 1028 | 1018 |

The earth plug 1012 is physically longer than the other plugs of the cartridge such that this connection makes first and breaks last.

Varistor Cartridges may be for single phase or 3 phase systems and may be rated for 415V, 240V or 120V inputs. The locations of the 415, 240V and 120V inputs on the Mother Board discriminate between 3 phase or single phase and 415, 240 or 120V Varistor Cartridges so that only a correctly specified Varistor Cartridge can be inserted into a particular SRF.

MOV and Status Circuit

The operation of a Varistor Cartridge will now be described with reference to FIGS. 7B and 11. FIGS. 7A & 7B provide a composite electrical schematic drawing for a single phase unit but have been marked with references for equivalent points in the second and third phase circuits of a 3 phase system. However it will be noted with reference to FIG. 11 that although in a three phase system, there are three cartridges, there are some differences in the Varistor Cartridges of a 3 phase system. In particular the cartridges of a 3 phase system include a raw active phase to phase MOV and a clean active phase to phase MOV (Phase N to Phase N-1 in each cartridge). Also in the cartridge of the 3 Phase system, there are no phase-to-earth MOVs (MOV701 & MOV705 in FIG. 7B).

1) The external (raw) and filtered (clean) active supplies 106 and 114 (see also FIG. 8) are connected to the MOV stack through fuses FS701 and FS702. (The MOV's are arranged so that in each pair connected to one fuse there is a MOV between Active and Neutral and another between Active and Earth). Fuse FS701 connected to the clean active supply 114 monitors MOV 701 (to earth) and MOV702 (to clean neutral) for short circuit. The line or external (raw) active supply 106 is connected to the MOV stack through fuse FS702. Fuse FS702 monitors MOV704 (to raw neutral) and MOV705 (to earth) for short circuit.

2) In the single phase circuit (FIG. 7B) two MOVs (MOV703 and MOV706) are connected between neutral and earth (MOV703 for the clean neutral and MOV706 for the raw neutral).

3) In the 3 phase circuit of FIG. 11, MOV701 & MOV705 (of FIG. 7B—actives to earth) are absent and phase to phase protection between the assigned phase of the cartridge and the adjacent phase are provided by MOV1101 (clean) and MOV1104 (raw). Fuse FS701 connected to the clean assigned active of the cartridge monitors MOV702 (to clean neutral) and MOV1101 (to clean adjacent phase) for short circuit. The external (raw) active assigned to the cartridge is connected to the MOV stack through fuse FS702. Fuse FS702 monitors MOV704 (to raw neutral) and MOV1104 (to raw adjacent phase) for short circuit.

4) In the single phase circuit (FIG. 713) two MOVs (MOV703 and MOV706) are connected respectively between the clean and raw neutrals and earth. In the 3 phase case (FIG. 11) MOV706 is omitted as the three SRF cartridges each carry a clean neutral-to-earth MOV.

5) In FIG. 7B the circuit comprising capacitor C701, zener diode Z701, diode D701, resistors R701, and capacitor C705 is a voltage limited half-wave rectifier and filter that supplies dc power to the B-series CMOS logic element packages U701, U702 and U703 ("N+11V").

6) Capacitor C701 and resistor R701 limit the maximum current through Z701 to within its rating.

7) Resistor R701 also limits the maximum forward surge current through diode D701 to a value within the rating of the diode.

8) Diode D701 itself prevents capacitor C705 from being discharged on negative half-cycles of the filtered mains during which the zener diode 2701 becomes forward-biased, such that its cathode is pulled down to about −700 mV with respect to Filtered Neutral 113.

9) Fuse monitoring circuits are provided, one for each fuse. The circuit that monitors fuse FS701 comprises capacitor C703, resistor R703, zener diode Z702, diode D702, resistor R704 and capacitor C704 which produce a signal F1 to drive Schmitt inverter U701C. When the signal F1 at the input of Schmitt inverter U701C is in the HI state it indicates that Fuse FS701 is intact. The circuit that monitors fuse FS702 includes an optical-coupler OC701, the photodiode of which is driven via capacitor C706 and resistor R709 from FS702.

The collector of the phototransistor of the optical coupler OC701 is held high (when off) by resistor R705 and the output is filtered by capacitor C707 and drives Schmitt inverter U701D. The input $\overline{F2}$ to Schmitt inverter U701D when in the active HI state indicate that fuse FS702 is blown (so the output F2 of U701D when in the HI state will indicate that Fuse FS702 is intact).

10) The capacitor C702 (100 nF) and resistor R702 (15 kΩ) form a voltage divider/filter which provides a line frequency signal to the clock input of the counter/divider circuit U701. Outputs of the counter/divider provide square wave outputs at 6.25 Hz and 0.78 Hz.

11) The indicator itself, that is LED701, is a tri-colour device having individual red, blue and green segments, LED701/1, LED701/2 and LED702/3 respectively. The red segment LED701/1 is driven by transistor F701 through resistor R708 under the control of gate U702A, the blue segment LED701/2 is driven by F702 through R707 under the control of gate U702B and the green segment LED701/3 is driven by F703 through R706 under the control of gate U701B. The outputs of all 3 gates are active LO.

12) Under normal circumstances with both fuses intact signal F1 will be HI and signal $\overline{F2}$ will be LO. The output of gate U701B will be LO so F703 will be switched on. The input combinations of neither U702A nor U702B will be fulfilled so both F701 and F702 will be switched off. So LED701 will glow green steadily to indicate that both fuses are intact and the load connected to the SRF is fully protected. RMIN will be connected to N+11V through R710.

13) If FS701 alone has operated, F1 will become LO thereby driving the outputs of gates U701A and U701B both HI. The input combination of U702B alone will be fulfilled whenever the 0.78 Hz signal from U703 is HI so F702 will be switched on and off at 0.78 Hz. The input combinations of neither U701B nor U702A will be fulfilled so both F701 and F703 will be switched off. So LED701 will flash blue at 0.78 Hz to indicate that one of the MOV banks inside that Cartridge has been overstressed, is therefore unreliable and has been disconnected (the Internal Bank in this case) meaning that the MOV cartridge should be replaced forthwith. RMIN will be disconnected from N+11V because F703 is switched off.

14) The effect of FS702 alone becoming operated is identical to that just described for the case of FS701 being operated.

15) When both FS701 and FS702 have operated both $\overline{F1}$ and $\overline{F2}$ are HI. The input combination of U702A alone will be fulfilled whenever the 0.78 Hz and 6.25 Hz signals from U703 are both HI so F701 will be switched on and off 4 times during every HI phase of the 0.78 Hz signal with a pattern termed "Burst Flashing". The input combinations of neither U701B nor U702B will be fulfilled so both F702 and F703 will be switched off. So LED701 will burst flash red to indicate that both MOV banks inside that Cartridge have been overstressed, are therefore unreliable and have been disconnected, meaning that the MOV cartridge must be replaced urgently. RMIN will be disconnected from N+11V because F703 is switched off.

Remote Monitor Interface

16) The (optional) Remote Monitor Interface assembly is designed to be deployed in either single- or 3-phase SRF's. Its specific purpose is to provide a means of reporting to some off-site location the condition of the Varistor Cartridge and hence the level of protection of the load connected to the SRF.

17) In the single-phase case as depicted, the 3 independent inputs to the Remote Monitor Interface are shorted together. So when signal RMIN is 1.0, NPN bipolar junction transistors Q701 and Q702 are both cut-off and the voltage at the junction of resistors R711 and R712 is zero, hence there is no path for current through LED702 or through the input LED's of solid state relays SSR701 and SSR702, whose respective output contacts are in their de-energised states.

18) When signal RMIN is HI, NPN transistors Q701 and Q702 are both saturated, and the junction of resistors R711 and R712 is connected to N+11V. Current can now flow through LED702 and the input LEDs of the solid state relays SSR701 and SSR702 so LED702 glow, and the output contacts of solid state relays SSR701 and SSR702 are driven into their respective energised states.

19) The truth table presented below summarises the behaviour of Led device LED701 and signal RMIN in response to all combinations of fuse states for a fully equipped dual redundancy Varistor Cartridge.

| FS701 (F1) | FS702 (F2) | LED701 | RMIN/LED702 |
| --- | --- | --- | --- |
| OPERATED | OPERATED | Red BURST | OFF |
| OPERATED | INTACT | Blue 1 Hz FLASH | OFF |
| INTACT | OPERATED | Blue 1 Hz FLASH | OFF |
| INTACT | INTACT | Green ON STEADY | ON STEADY |

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A surge reduction filter (SRF) comprising:
   a cartridge including a cartridge housing and a plurality of contact points;
   a first active connection point for connection to an active line of an AC power supply, and a first neutral connection point for connection to a neutral line of the AC power supply, the active and neutral connection points being located to be accessible from outside the cartridge;
   a first fuse and a first surge protection element electrically connected in series between the first active connection point and the first neutral connection point;
   a status circuit to monitor the first surge protection element;
   an indicator electrically connected to the status circuit to indicate at least a normal status and a fault status of the first surge protection element, the status circuit detecting a change in voltage at a point between the first fuse and the first surge protection element and creating a fault indication when a voltage change is detected due to the first fuse operating;
   a cartridge tray into which the cartridge is insertable;
   a plurality of connectors projecting from a base of the cartridge tray;
   a plurality of co-operating connectors projecting from the cartridge and associated with the plurality of contact points of the cartridge, wherein the plurality of co-operating connectors co-operate with the plurality of connectors of the base to connect the status circuit to an external circuit comprising the AC supply, and wherein each of the active line and the neutral line of the AC power supply is a single piece of solid metal conductor with no intermediate joins or connections and being routed under the tray.

2. The SRF of claim 1 wherein one side of the first fuse is connected to the first active connection point and the first surge protection element is connected between the second side of the first fuse and the first neutral connection point.

3. The SRF of claim 1 wherein the cartridge includes an earth connection point, a second fuse and a second surge protection element, the earth connection point being located to be accessible from outside the cartridge, and the second fuse and the second surge protection element are connected in series between the first active connection point and the earth connection point.

4. The SRF of claim 3 wherein one side of the second fuse is connected to the first active connection point and the second surge protection element is connected between the second side of the second fuse and the earth connection point.

5. The SRF of claim 3 wherein the cartridge includes a third surge protection element connected between the second side of the first fuse and the earth connection point.

6. The SRF of claim 3 wherein the cartridge includes a fourth surge protection element connected between the second side of the second fuse and the first neutral connection point.

7. The SRF of claim 1 wherein the cartridge includes a second active connection point for connection to a different phase of the AC power supply with respect to the phase of the first active connection point, a second fuse and a second surge protection element, the second active connection point being located to be accessible from outside the cartridge, and the second fuse and the second surge protection element are connected in series between the first active connection point and the second active connection point.

8. The SRF of claim 7 wherein one side of the second fuse is connected to the first active connection point and the second surge protection element is connected between the second side of the second fuse and the second active connection point.

9. The SRF of claim 7 wherein the cartridge includes a third surge protection element connected between the second side of the first fuse and the second active connection point.

10. The SRF of claim 7 wherein the cartridge includes a fourth surge protection element connected between the second side of the second fuse and the first neutral connection point.

11. The SRF of claim 3 wherein the status circuit monitors the state of each of the first and second fuses and produces a different fault indication when one fuse is operated compared to a fault indication produced when two fuses are operated.

12. The SRF of claim 3 wherein the cartridge includes a fifth surge protection element connected between the first neutral connection point and the earth connection point.

13. The SRF of claim 12 wherein the cartridge includes a sixth surge protection element connected between the first neutral connection point and the earth connection point.

14. The SRF of claim 1 wherein the cartridge includes second active connection point, a second neutral connection point, a second fuse and a second surge protection element, the second active connection point and the second neutral connection point being located to be accessible from outside the cartridge, and the second fuse and the second surge protection element are connected in series between the second active connection point and the second neutral connection point.

15. The SRF of claim 14 wherein the cartridge includes an earth connection point, and a third surge protection element, the earth connection point being located to be accessible from outside the cartridge, and the first fuse and the third surge protection element are connected in series between the first active connection point and the earth connection point.

16. The SRF of claim 15 wherein the third surge protection element is connected between the second side of the first fuse and the earth connection point.

17. The SRF of claim 14 wherein the cartridge includes a fourth surge protection element connected between the second side of the second fuse and the earth connection point.

18. The SRF of claim 1 wherein the cartridge includes a second active connection point for connection to a different phase of the AC power supply with respect to the phase of the first active connection point, and a second surge protection element, the second active connection point being located to be accessible from outside the cartridge, and the first fuse and the second surge protection element are connected in series between the first active connection point and the second active connection point.

19. The SRF of claim 18 wherein one side of the first fuse is connected to the first active connection point and the second surge protection element is connected between the second side of the first fuse and the second active connection point.

20. The SRF of claim 18 wherein the cartridge includes a third active connection point for connection to a third active supply line of the AC power supply, and a second neutral connection point for connection to a second neutral line of the AC power supply, the third active connection point and the second neutral connection point being located to be accessible from outside the cartridge, a second fuse and a third surge protection element electrically connected in series between the third active connection point and the second neutral connection point.

21. The SRF of claim 20 wherein the cartridge includes a fourth active connection point for connection to a different phase of the AC power supply with respect to the phase of the third active connection point, and a fourth surge protection element, the fourth active connection point being located to be accessible from outside the cartridge, and the second fuse and the fourth surge protection element are connected in series between the fourth active connection point and an earth connection point.

22. The SRF of claim 21 wherein one side of the second fuse is connected to the third active connection point and the fourth surge protection element is connected between the second side of the second fuse and the fourth active connection point.

23. The SRF of claim 20 wherein the first and second active connection points are arranged to be connected to filtered active supply lines of the AC supply, the first neutral connection point is arranged to be connected to a filtered neutral supply line of the AC supply, the third and fourth active connection points are arranged to be connected to unfiltered active supply lines of the AC supply and the second neutral connection point is arranged to be connected to an unfiltered neutral line of the AC power supply.

24. The SRF of claim 14 wherein the status circuit monitors the state of each of the first and second fuses and produces a different fault indication when one fuse is operated compared to a fault indication produced when two fuses are operated.

25. The SRF of claim 15 wherein the cartridge includes a fifth surge protection element connected between the first neutral connection point and the earth connection point.

26. The SRF as claimed in claim 1 wherein the cartridge tray and the cartridge are co-operatively keyed for correct orientation of insertion of the cartridge into the cartridge tray.

27. The SRF as claimed in claim 1 wherein the connector location in the cartridge tray and cartridge varies according to a cartridge voltage rating to co-operatively key the cartridge and cartridge tray to prevent connection of an incorrectly rated cartridge.

28. The SRF as claimed in claim 1 wherein the cartridge includes a status indicating LED which indicates a status of the surge protection elements monitored by the status circuit, the status circuit driving the LED to indicate a fault condition by changing a state of emission of the LED.

29. The SRF as claimed in claim 1 wherein the cartridge includes a monitoring connection point and the status circuit includes a remote monitoring output connected to the monitoring connection point, co-operating connectors projecting from the base of the cartridge tray and the cartridge associated with the monitoring connection point to connect the remote monitoring output to a remote monitor interface.

30. The SRF as claimed in claim 1 wherein the surge protection element is an MOV.

* * * * *